US012761378B2

(12) United States Patent
Miura et al.

(10) Patent No.: US 12,761,378 B2
(45) Date of Patent: Oct. 13, 2026

(54) RADIATION IMAGING APPARATUS AND RADIATION IMAGING SYSTEM

(71) Applicant: CANON KABUSHIKI KAISHA, Tokyo (JP)

(72) Inventors: Ryosuke Miura, Chiba (JP); Toshitaka Noro, Saitama (JP); Jun Kawanabe, Saitama (JP); Hideaki Morita, Tokyo (JP); Hiroto Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 18/645,123

(22) Filed: Apr. 24, 2024

(65) Prior Publication Data

US 2024/0361471 A1 Oct. 31, 2024

(30) Foreign Application Priority Data

Apr. 28, 2023 (JP) ................................ 2023-074208
Apr. 28, 2023 (JP) ................................ 2023-074209
(Continued)

(51) Int. Cl.
*G01T 1/02* (2006.01)
*G01T 1/24* (2006.01)
*G01T 1/29* (2006.01)

(52) U.S. Cl.
CPC .............. *G01T 1/026* (2013.01); *G01T 1/247* (2013.01); *G01T 1/2928* (2013.01)

(58) Field of Classification Search
CPC ....... G01T 1/026; G01T 1/247; G01T 1/2928; A61B 6/4233; A61B 6/54; A61B 6/542; A61B 6/586
See application file for complete search history.

(56) References Cited

U.S. PATENT DOCUMENTS 4,845,771 A * 7/1989 Wislocki .................. H05G 1/30 378/97
5,694,449 A * 12/1997 Aragones ................ H05G 1/44 378/115
(Continued)

FOREIGN PATENT DOCUMENTS

EP 0809422 B1 1/2004
JP H1043170 A 2/1998
(Continued)

*Primary Examiner* — David J Makiya
*Assistant Examiner* — Soorena Kefayati
(74) *Attorney, Agent, or Firm* — Canon U.S.A., Inc. IP Division

(57) ABSTRACT

A radiation imaging apparatus includes a radiation detector configured to be subjected to an incident radiation to obtain a radiation image, and controllers configured to acquire radiation dose information, acquire imaging condition information for radiation imaging for subjecting the radiation detector to the incident radiation for up to a target radiation dose to acquire a radiation image, and issue, in a case where, after a start of the radiation imaging based on the imaging condition information, radiation dose information acquired by a predetermined timing does not satisfy a predetermined condition, a notification for stopping the radiation irradiation by a radiation generation apparatus so that the radiation irradiation by the radiation generation apparatus stops before the incident radiation dose reaches the target radiation dose, wherein the predetermined timing is a timing determined based on radiation irradiation time set in the radiation generation apparatus.

16 Claims, 15 Drawing Sheets

(30) Foreign Application Priority Data

| | | | |
|---|---|---|---|
| Jun. 19, 2023 | (JP) | ................................. | 2023-100299 |
| Jan. 25, 2024 | (JP) | ................................. | 2024-009255 |

(56) References Cited

U.S. PATENT DOCUMENTS

| | | | | |
|---|---|---|---|---|
| 2013/0148784 | A1* | 6/2013 | Tajima ................. | A61B 6/4283 378/62 |
| 2014/0177798 | A1* | 6/2014 | Kitagawa ................. | A61B 6/56 378/62 |
| 2014/0211922 | A1* | 7/2014 | Kuwabara ................ | A61B 6/56 378/97 |
| 2015/0055752 | A1* | 2/2015 | Takahashi .............. | H04N 25/67 378/91 |
| 2020/0008766 | A1* | 1/2020 | Watanabe ................. | G01T 7/00 |
| 2020/0120783 | A1* | 4/2020 | Kuwata .................. | A61B 6/542 |
| 2020/0187877 | A1* | 6/2020 | Chakrabarti ........... | A61B 6/583 |
| 2020/0252562 | A1* | 8/2020 | Umekawa .............. | A61B 6/586 |

FOREIGN PATENT DOCUMENTS

| | | | |
|---|---|---|---|
| JP | 2011010870 | A | 1/2011 |
| JP | 2013176544 | A | 9/2013 |
| JP | 2013188245 | A | 9/2013 |
| JP | 2013233420 | A | 11/2013 |
| JP | 2014050418 | A | 3/2014 |
| JP | 2014090869 | A | 5/2014 |
| JP | 2019058608 | A | 4/2019 |
| JP | 2019126709 | A | 8/2019 |
| JP | 2020038228 | A | 3/2020 |
| JP | 2023018768 | A | 2/2023 |

* cited by examiner

LIGHTING FIELDS DETERMINED FOR EARLY STOP
*CUMULATIVE DOSE IS ASSUMED TO BE LOCALLY REDUCED BY INFLUENCE OF IMPLANT SINCE THESE LIGHTING FIELDS ARE SURROUNDED BY LIGHTING FIELDS NOT DETERMINED FOR EARLY STOP
⇒ EARLY STOP PROCESSING IS NOT PERFORMED SINCE NO IMAGING PROBLEM IS DETERMINED

RADIATION IMAGING APPARATUS AND RADIATION IMAGING SYSTEM

BACKGROUND OF THE INVENTION

Field of the Invention

The present disclosure relates to a radiation imaging apparatus and a radiation imaging system. Radiation imaging apparatuses are used as a medical diagnosis apparatus and a non-destructive inspection apparatus. Examples of radiation imaging apparatuses include an X-ray flat panel detector.

Description of the Related Art

A technique for measuring a radiation dose incident on a radiation imaging apparatus for imaging control is known to be used for a conventional radiation imaging apparatus for acquiring a radiation image using radiation. Examples of such techniques include an automatic exposure control (AEC) function. Japanese Patent Application Laid-Open No. 2014-90869 discloses a radiation imaging apparatus having the AEC function. The use of the AEC function enables a reduction in the amount of radiation that a subject is exposed to when completing radiation imaging.

A technique discussed in Japanese Patent Application Laid-Open No. 2014-90869 has room for improvement in the exposure amount of a subject in a case where radiation imaging cannot be completed normally. There may be a situation where radiation imaging cannot be completed normally because of various factors. Examples of such situations include a case of an X-ray imaging system including a plurality of radiation imaging apparatuses and automatic exposure control (AEC) sensors. In this case, the radiation imaging apparatuses may not be irradiated with X-ray with a desired radiation dose because of a wrong selection of the radiation imaging apparatus or AEC sensor to be used, a wrong orientation of an X-ray tube, or a wrong selection of irradiation fields. In such a situation, the subject will be exposed to radiation even though the radiation imaging cannot be completed normally. It is desirable to quickly detect a situation where radiation imaging cannot be completed normally, and stop the radiation irradiation.

SUMMARY OF THE INVENTION

The present disclosure is directed to reducing the exposure amount to a subject during radiation imaging.

According to a first aspect of the present disclosure, there is provided a radiation imaging apparatus including a radiation detector configured to be subjected to an incident radiation to obtain a radiation image, and one or more controllers configured to acquire radiation dose information of the radiation incident on the radiation detector, acquire imaging condition information for radiation imaging for subjecting the radiation detector to the incident radiation for up to a target radiation dose to acquire a radiation image, and issue, in a case where, after a start of the radiation imaging based on the imaging condition information, radiation dose information acquired by a predetermined timing does not satisfy a predetermined condition, a notification for stopping the radiation irradiation by a radiation generation apparatus so that the radiation irradiation by the radiation generation apparatus stops before the incident radiation dose reaches the target radiation dose, wherein the predetermined timing is a timing determined based on radiation irradiation time set in the radiation generation apparatus.

According to a second aspect of the present disclosure, there is provided a radiation imaging system comprising a radiation imaging apparatus having a radiation detector configured to be subjected to an incident radiation to obtain a radiation image, and a radiation generation apparatus configured to perform radiation irradiation, the radiation imaging system comprising one or more controllers configured to acquire radiation dose information of the radiation incident on the radiation detector, acquire imaging condition information for radiation imaging for subjecting the radiation detector to the incident radiation for up to a target radiation dose to acquire a radiation image, and stop, in a case where, after a start of the radiation imaging based on the imaging condition information, radiation dose information acquired by a predetermined timing does not satisfy a predetermined condition, the radiation irradiation by the radiation generation apparatus before the incident radiation dose reaches the target radiation dose, wherein the predetermined timing is a timing determined based on radiation irradiation time set in the radiation generation apparatus.

According to a third aspect of the present disclosure, there is provided a radiation imaging apparatus including a radiation detector configured to be subjected to an incident radiation to obtain a radiation image, a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, after a start of the radiation imaging based on the imaging condition information, a notification for stopping the radiation irradiation by a radiation generation apparatus so that the radiation irradiation by the radiation generation apparatus stops before the incident radiation dose reaches the target radiation dose.

The notification may be issued in a case where, after the start of the radiation imaging based on the imaging condition information, radiation dose information acquired by a predetermined timing does not satisfy a predetermined condition. The notification may not be issued in a case where, after the start of the radiation imaging based on the imaging condition information, the radiation dose information acquired by the predetermined timing satisfies the predetermined condition.

According to a fourth aspect of the present disclosure, there is provided a radiation imaging system which includes a radiation imaging apparatus having a radiation detector configured to be subjected to an incident radiation to obtain a radiation image, and a notification apparatus configured to notify a user of information. The radiation imaging apparatus includes a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, after a start of the radiation imaging based on the imaging condition information, a notification to the notification apparatus based on radiation dose information acquired by a predetermined timing before the target radiation dose may be reached. The notification apparatus includes a unit configured to issue a notification to the user based on the notification.

According to a fifth aspect of the present disclosure, there is provided a radiation imaging apparatus including a radiation detector configured to be subjected to an incident radiation emitted by a radiation generation apparatus, to obtain a radiation image, a unit configured to permit the radiation irradiation performed by the radiation generation apparatus, a unit configured to acquire time information since the permission may be issued till the radiation generation apparatus performs the radiation irradiation, a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, in a case where, after a start of the radiation imaging based on the imaging condition information, radiation dose information acquired by a predetermined timing based on at least the time information satisfies a predetermined condition, a notification for stopping the radiation irradiation by the radiation generation apparatus so that the radiation irradiation by the radiation generation apparatus stops before the incident radiation dose reaches the target radiation dose.

According to a sixth aspect of the present disclosure, there is provided a radiation imaging apparatus includes a radiation detector configured to be subjected to an incident radiation having penetrated a subject to acquire a radiation image, the radiation detector having a plurality of lighting fields for acquiring radiation dose information of the incident radiation, a unit configured to acquire imaging condition information for radiation imaging for subjecting a predetermined lighting field group out of the plurality of lighting fields to the incident radiation for up to a target radiation dose to acquire a radiation image, and a unit configured to issue, in a case where, after a start of the radiation imaging based on the imaging condition information, radiation dose information of the predetermined lighting field group does not satisfy a predetermined condition, a notification for stopping radiation irradiation by a radiation generation apparatus so that the radiation irradiation by the radiation generation apparatus stops before a radiation dose incident on the predetermined lighting field reaches the target radiation dose.

The following passages define optional features of present disclosure, according to any one of the above-described aspects.

The predetermined timing may be a timing starting from any one of a start of a radiation dose detection operation, an exposure permission, a start of an accumulation operation, and a start of radiation. The predetermined condition may be a condition that the dose information acquired by the predetermined timing exceeds a predetermined threshold value. The predetermined timing may be a timing determined based on radiation irradiation time set in the radiation generation apparatus. The apparatus includes a unit configured to issue a further notification for stopping the radiation irradiation by the radiation generation apparatus to complete the radiation imaging after subjecting the radiation detector to the incident radiation for up to the target radiation dose. The notification may be preferentially processed over other communications. The notification may be based on a communication delay between the radiation imaging apparatus and the radiation generation apparatus. The imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information. In the radiation detector, imaging pixels for acquiring the radiation image and detection pixels for acquiring the radiation dose information may be disposed on a same single substrate. The detection pixels for acquiring the radiation dose information may be disposed on a substrate different from a substrate of the imaging pixels for acquiring the radiation image. There may be provided a radiation imaging system including the radiation imaging apparatus according to any one of preceding statements, and the radiation generation apparatus.

In a radiation imaging system including a radiation imaging apparatus having a radiation detector configured to be subjected to an incident radiation to obtain a radiation image, and a radiation generation apparatus configured to perform radiation irradiation, the radiation generation apparatus may include a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to stop, after a start of the radiation imaging based on the imaging condition information, radiation irradiation before the incident radiation dose reaches the target radiation dose.

In the radiation imaging system according to any one of the preceding statements, the notification may be configured to notify the user of insufficient incident radiation. The notification may be configured to notify the user of no incident radiation.

The notification may be issued in a case where, after the start of the radiation imaging based on the imaging condition information, the radiation dose information acquired by the predetermined timing does not satisfy the predetermined condition. The notification may not be issued in a case where, after the start of the radiation imaging based on the imaging condition information, the radiation dose information acquired by the predetermined timing satisfies the predetermined condition.

The predetermined timing may be a timing starting from any one of a start of a radiation dose detection operation, an exposure permission, a start of an accumulation operation, and a start of radiation. The predetermined condition may be a condition that the radiation dose information acquired by the predetermined timing exceeds a predetermined threshold value. The predetermined timing may be a timing determined based on radiation irradiation time set in the radiation generation apparatus. The apparatus includes a unit configured to issue a further notification for stopping the radiation irradiation by the radiation generation apparatus to complete the radiation imaging after subjecting the radiation detector to the incident radiation for up to the target radiation dose. The notification may be preferentially processed over other communications. The notification may be based on a communication delay between the radiation imaging apparatus and the radiation generation apparatus. The imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information.

In the radiation detector, imaging pixels for acquiring the radiation image and detection pixels for acquiring the radiation dose information may be disposed on a same single substrate. The detection pixels for acquiring the radiation dose information may be disposed on a substrate different from a substrate of the imaging pixels for acquiring the radiation image. There may be provided a radiation imaging system including the radiation imaging apparatus according to any one of the preceding statements, and the radiation generation apparatus.

The notification may be issued in a case where, after a start of the radiation imaging based on the imaging condition information, the radiation dose information acquired from the predetermined lighting field group by a predetermined timing does not satisfy the predetermined condition. The notification may not be issued in a case where, after the start of the radiation imaging based on the imaging condition information, the radiation dose information acquired from the predetermined lighting field group by the predetermined timing satisfies the predetermined condition.

The predetermined timing may be a timing starting from any one of a start of a radiation dose detection operation, an exposure permission, a start of an accumulation operation, and a start of radiation. The predetermined condition may be a condition that the radiation dose information acquired from the predetermined light field group by the predetermined timing exceeds a predetermined threshold value.

The predetermined timing may be a timing determined based on radiation irradiation time set in the radiation generation apparatus. The notification may be issued in a case where, after the start of the radiation imaging based on the imaging condition information, the radiation dose information acquired from the predetermined lighting field group by a predetermined timing does not satisfy the predetermined condition, and the radiation dose information acquired from another lighting field group related to the predetermined light field group does not satisfy the predetermined condition.

The notification may not be issued in a case where, after the start of the radiation imaging based on the imaging condition information, the radiation dose information acquired from the predetermined lighting field group by the predetermined timing does not satisfy the predetermined condition, and the radiation dose information acquired from another lighting field group satisfies the predetermined condition.

The predetermined condition may be a threshold value condition determined based on the target radiation dose. The predetermined condition may be a comparison condition determined based on the imaging condition information. The imaging condition information may include information for identifying an imaging portion, and the radiation dose information of the predetermined lighting field group may be radiation dose distribution information. The radiation imaging apparatus may include a unit configured to determine whether to issue the notification based on a difference between the information about the imaging portion and the radiation dose distribution information as the comparison condition.

The predetermined lighting field group may be a part of the plurality of lighting fields. The apparatus includes a unit configured to issue a further notification for stopping the radiation irradiation by the radiation generation apparatus to complete the radiation imaging after subjecting the predetermined lighting field to the incident radiation for up to the target radiation dose.

The notification may be preferentially processed over other communications. The notification may be based on a communication delay between the radiation imaging apparatus and the radiation generation apparatus. The imaging condition information includes at least one of an X-ray tube voltage and an X-ray tube current in a radiation tube, the target radiation dose, a threshold value for normal stop determination, set irradiation time, timing information for early stop determination, threshold value information for early stop determination, and lighting field information. In the radiation detector, imaging pixels for acquiring the radiation image and detection pixels for acquiring the radiation dose information may be disposed on a same single substrate. The detection pixels for acquiring the radiation dose information may be disposed on a substrate different from a substrate of imaging pixels for acquiring the radiation image. There may be provided a radiation imaging system including the radiation imaging apparatus according to any one of the preceding statements, and the radiation generation apparatus.

Any feature of the preceding aspects may be applied to other aspects of the disclosure, in any appropriate combination.

Further features of the present disclosure will become apparent from the following description of embodiments with reference to the attached drawings.

DESCRIPTION OF THE EMBODIMENTS

Specific embodiments of the present disclosure will be described below with reference to the accompanying drawings. The following embodiments do not limit the present disclosure within the scope of the appended claims. Although a plurality of features will be described in the embodiments, not all of the plurality of features is indispensable to the present disclosure, and the plurality of features may be arbitrarily combined.

<System>

Figure 1:
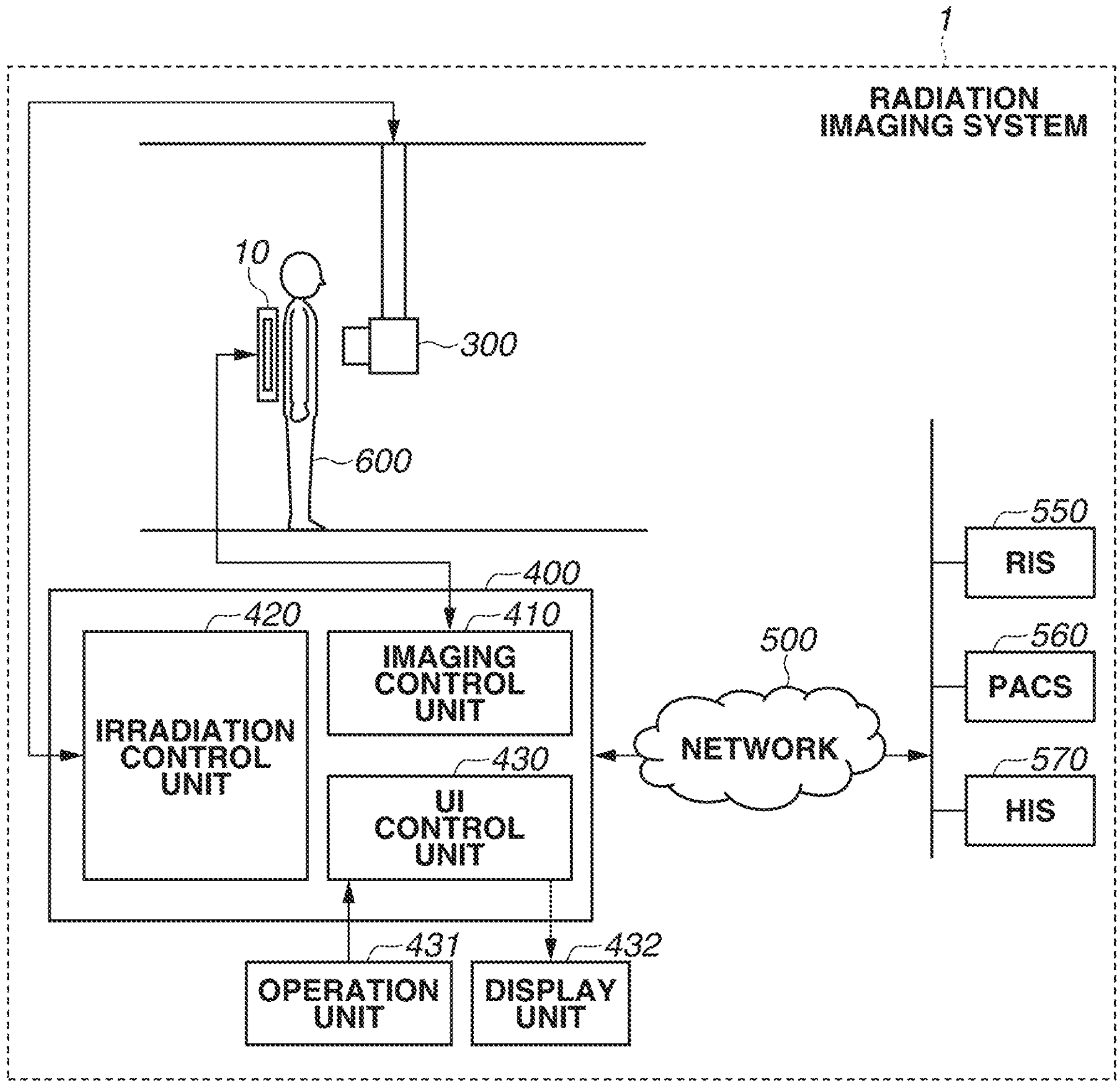
FIG. 1 illustrates an overall configuration of a radiation imaging system.

FIG. 1 illustrates an overall configuration of a radiation imaging system. A radiation imaging system 1 includes a radiation imaging apparatus 10, a control apparatus 400, a radiation generation unit 300, a radiology information system (RIS) 550, a picture archiving and communication system (PACS) 560, and a hospital information system (HIS) 570. RIS is an abbreviation for Radiology Information System (information system in radiology section). PACS is an abbreviation for Picture Archiving and Communication System (image server). HIS is an abbreviation for Hospital Information System (in-house information system).

The radiation generation unit (radiation generation apparatus) 300 includes a radiation tube for generating a radiation to irradiate a subject 600 such as a patient with a radiation.

The radiation imaging apparatus 10 generates an image based on the radiation emitted from the radiation generation unit 300 and having transmitted (penetrated) through the subject such as a patient. The radiation imaging apparatus 10 is, for example, a flat panel detector. The radiation imaging apparatus 10 has a function of performing an automatic exposure control (hereinafter referred to as AEC). The radiation imaging apparatus 10 will be described in detail below.

The control apparatus 400 relays different apparatuses connectable via the radiation imaging apparatus 10, the radiation generation unit 300, and a network 500. The control apparatus 400 includes an imaging control unit 410, an irradiation control unit 420, and a user interface (UI) control unit 430.

The imaging control unit 410 communicates with the radiation imaging apparatus 10 to perform different types of control for radiation imaging (radiography). For example, the imaging control unit 410 subjects the radiation imaging apparatus 10 to various kinds of communication processing involved in radiation imaging. Information communicated in this communication processing include imaging condition setting information, operation control setting information, image information, and attained radiation dose information.

The irradiation control unit 420 communicates with the radiation generation unit 300 to control radiation irradiation conditions.

The irradiation control unit 420 outputs such information as an irradiation control signal to the radiation generation unit 300 based on the acquired radiation dose information.

The irradiation control signal transmitted from the irradiation control unit 420 to the radiation generation unit 300 may include two different signals: a stop signal (radiation stop signal) for stopping the radiation irradiation and an irradiation signal (non-radiation stop signal) for performing irradiation radiation. The irradiation control unit 420 controls the output of both the stop signal and the irradiation signal or either one signal to control the start and stop of radiation irradiation from the radiation generation unit 300.

The UI control unit 430 controls information input via an operation unit 431 and information output via a display unit 432. For example, radiation imaging conditions are input via the operation unit 431, and the result of radiation imaging is output via the display unit 432. The operation unit 431 includes input apparatuses such as a keyboard, a pointing device (e.g., mouse), and a touch panel. The display unit 432 includes a monitor such as a liquid crystal display (LCD).

Various pieces of information necessary for radiation imaging are input to the UI control unit 430 by an operator. Examples of input information include the radiation dose, irradiation time (ms), an X-ray tube current (mA), an X-ray tube voltage (kV), and lighting fields as regions for radiation detection. These pieces of information are transmitted to the radiation imaging apparatus 10 via the imaging control unit 410.

The imaging control unit 410, the irradiation control unit 420, and the UI control unit 430 communicate with each other to operate in collaboration. Although FIG. 1 illustrates the control apparatus 400 as one apparatus to simplify descriptions, the control apparatus 400 may include a plurality of apparatuses.

For example, the imaging control unit 410, the irradiation control unit 420, and the UI control unit 430 may be independent of each other.

The control apparatus 400, wiredly connected with the radiation generation unit 300 and wiredly or wirelessly connected with the radiation imaging apparatus 10, communicates with these apparatuses to control their operations. Although wired communication may be performed via a local area network (LAN) such as Ethernet®, other wired communication methods are also applicable. Examples of wireless communication components include an antenna and a communication integrated circuit (IC). A circuit board including the communication IC performs communication processing conforming to a wireless-LAN-based protocol via the antenna. Frequency bands, standards, and methods for wireless communication are not particularly limited. Applicable communication methods include Near Field Communication (NFC), Bluetooth®, and other short-range wireless communications, and Ultra-Wide Band (UWB). Communication may be performed while suitably selecting any one of a plurality of wireless communication methods.

The control apparatus 400 is connected with the RIS 550, the PACS 560, and the HIS 570 via the network 500 to communicate radiation images and patient information. Although the radiation imaging system 1 in FIG. 1 includes the RIS 550, the PACS 560, and the HIS 570, the radiation imaging system 1 may not include at least a part of these systems.

<Control Apparatus>

Figure 4:
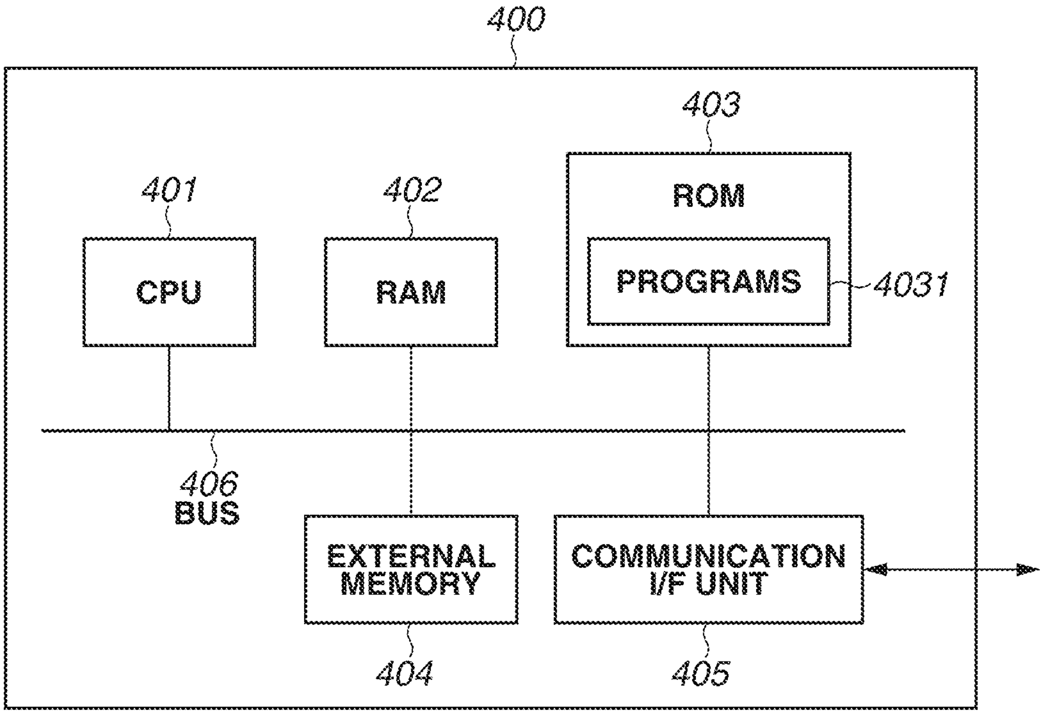
FIG. 4 illustrates a configuration of a control apparatus.

FIG. 4 illustrates a configuration of the control apparatus 400. The control apparatus 400 includes a central processing unit (CPU) 401, a random access memory (RAM) 402, a read only memory (ROM) 403, an external memory 404, a communication interface (I/F) unit 405, and a bus 406. The CPU 401, the RAM 402, the ROM 403, the external memory 404, and the communication I/F unit 405 are communicably connected with each other via the bus 406.

The CPU 401 totally controls the operation of the control apparatus 400 and controls each component illustrated in FIG. 4 via the bus 406.

The RAM (writable memory) 402 functions as the main memory of the CPU 401 and a working area. When CPU 401 performs processing, the CPU 401 loads necessary computer programs 4031 and data from the ROM 403 into the RAM 402, and executes the computer programs 4031 to implement various functions and operations.

The ROM 403 stores the computer programs 4031 and data necessary for the CPU 401 to perform processing. The computer programs 4031 and data may be stored in the external memory 404.

The external memory 404 as a mass-storage device is implemented by, for example, a hard disk drive and an IC memory. The external memory 404 stores, for example, various kinds of data and various kinds of information necessary for the CPU 401 to execute the computer programs 4031 to perform processing. The external memory 404 also stores, for example, various kinds of data and various kinds of information obtained after the CPU 401 executes the computer programs 4031 to perform processing. The communication I/F unit 405 controls communication between the control apparatus 400 and an external apparatus. The bus 406 communicably connects the CPU 401 with the RAM 402, the ROM 403, the external memory 404, and the communication I/F unit 405.

Although the control apparatus 400 is provided, for example, as a dedicated built-in apparatus, the present disclosure is not limited thereto. The control apparatus 400 may be implemented by a personal computer (PC), a tablet terminal, or other general-purpose information processing apparatuses. As described above, the control apparatus 400 may include a plurality of apparatuses. In this case, each of the plurality of apparatuses may include the above-described components.

<Radiation Imaging Apparatus>

Figure 2:
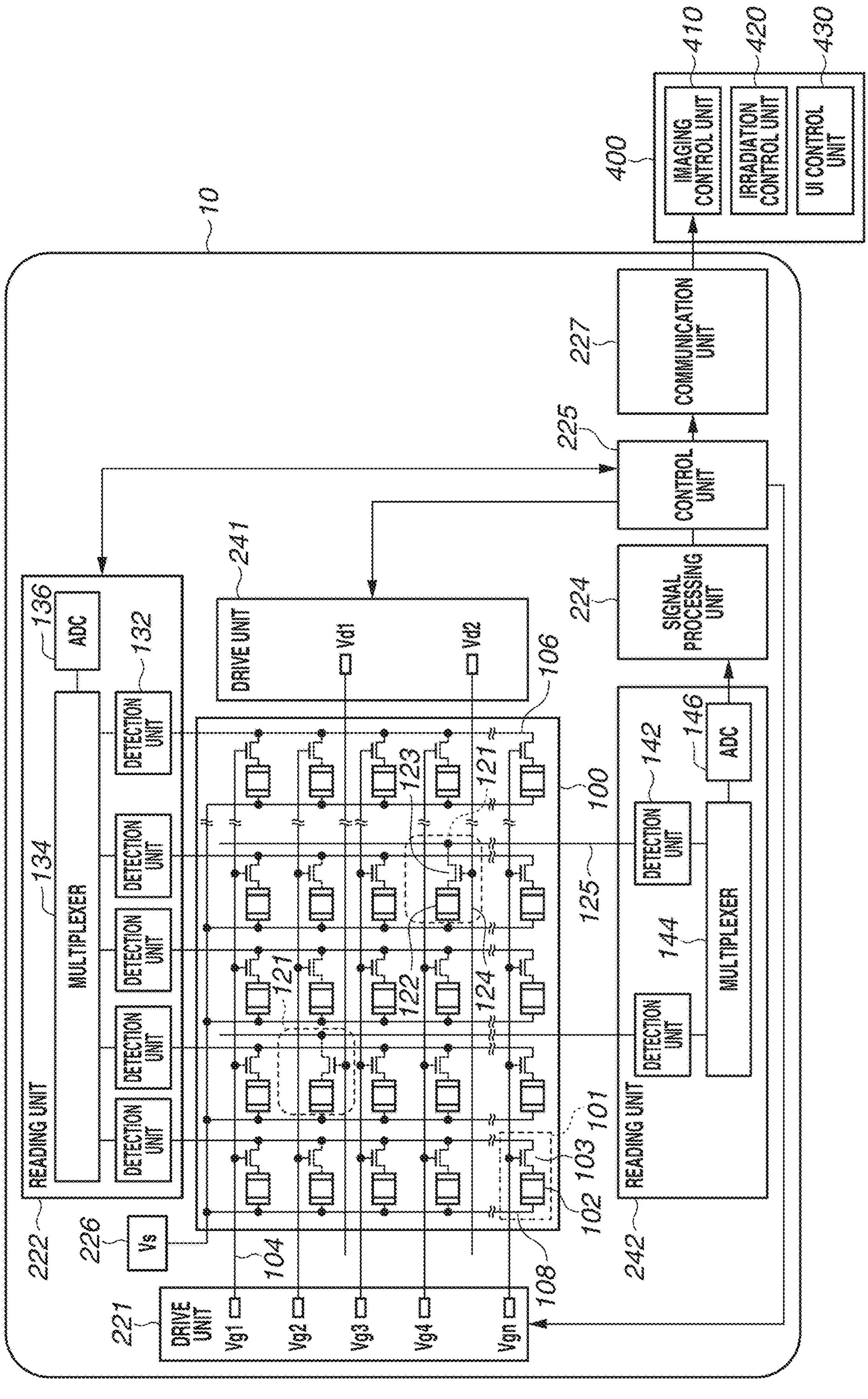
FIG. 2 illustrates a configuration of a radiation imaging apparatus.

FIG. 2 illustrates a configuration of the radiation imaging apparatus 10. The radiation imaging apparatus 10 includes a radiation detector 100 (sensor panel) having a plurality of pixels arranged in a plurality of rows and a plurality of columns in an imaging region. The plurality of pixels includes a plurality of imaging pixels 101 for acquiring a radiation image based on the detected radiation, and a plurality of detection pixels 121 for dose detection (dose detection pixels) for monitoring the radiation dose of the radiation emitted from the radiation generation unit 300.

Each of the imaging pixels 101 includes a conversion element 102 for converting the radiation into an electrical signal, and a switching element 103 disposed between a column signal line 106 and the conversion element 102. Like the imaging pixels 101, each of the detection pixels 121 for dose detection also includes a conversion element 122 for converting the radiation into an electrical signal and a switching element 123 disposed between a detection signal line 125 and the conversion element 122.

Each of the conversion elements 102 and 122 includes a scintillator for converting the radiation into light, and a photoelectric conversion element for converting light into an electrical signal. The scintillator is formed in a sheet form to cover the imaging region of the radiation detector 100 including the plurality of the imaging pixels 101 and 121. The conversion elements 102 and 122 may be replaced with conversion elements for directly converting the radiation into an electrical signal.

Each of the switching elements 103 and 123 is a thin film transistor (TFT) including an active region made of a semiconductor such as amorphous silicon or polycrystalline silicon. According to the present embodiment, TFTs made of polycrystalline silicon are used as the switching elements 103 and 123.

The radiation imaging apparatus 10 includes a plurality of the column signal lines 106 and a plurality of drive lines 104. Each of the column signal lines 106 corresponds to each of the plurality of columns in the imaging region of the radiation detector 100. Each of the drive lines 104 corresponds to each of the plurality of rows in the imaging region of the radiation detector 100. A "column" indicates the vertical direction in FIG. 4, and a "row" indicates the horizontal direction in FIG. 4. Each of the drive lines 104 is supplied with a drive signal by a drive unit 221.

Figure 3A:
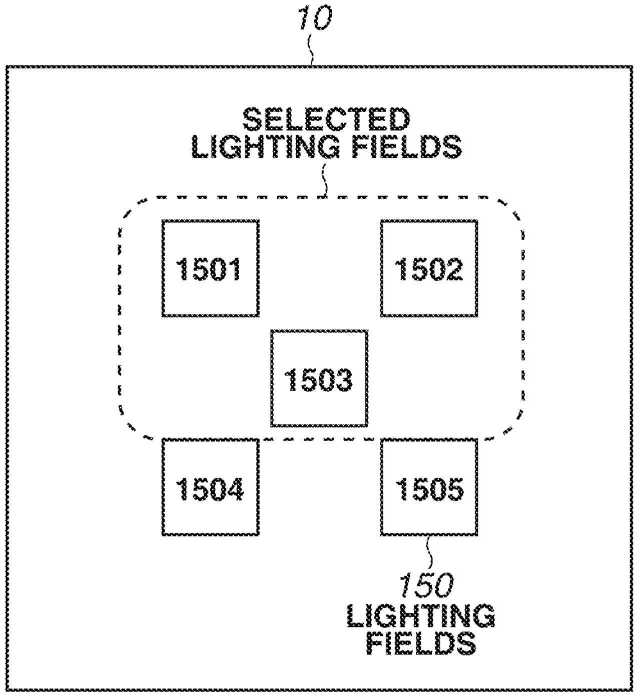
FIG. 3A illustrates lighting fields.
Figure 3B:
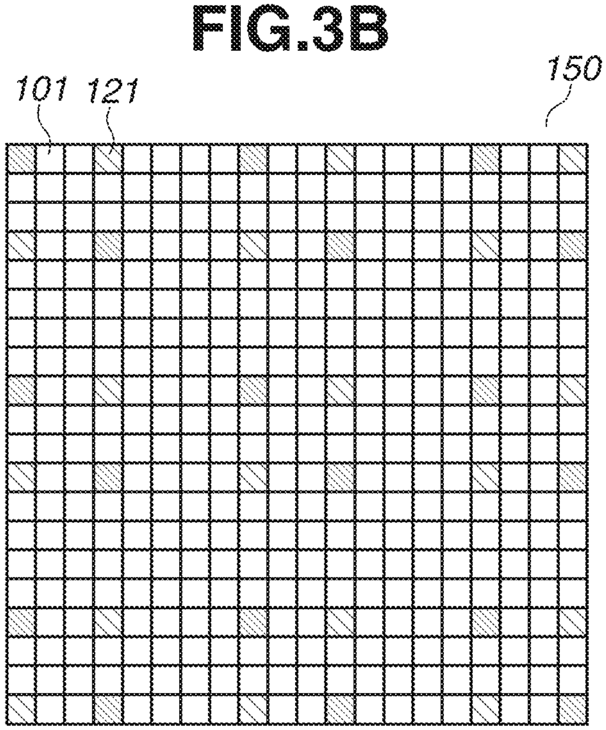
FIG. 3B illustrates pixel arrangements in a lighting field.

In the imaging region of the radiation detector 100, pixels are arranged to form a plurality of lighting fields. FIG. 3A illustrates lighting fields. FIG. 3B illustrates pixel arrangements in a lighting field.

Lighting fields 150 are used to detect the radiation dose during imaging, by using a plurality of the detection pixels 121 arranged therein. There are various methods for arranging the plurality of the lighting fields 150. Arranging the lighting fields 150 symmetrically with respect to the center of the radiation imaging apparatus 10 enables using them in a similar way regardless of the orientation of the radiation imaging apparatus 10. Applicable shapes of a lighting field 150 include a quadrangle (square and rectangle), circle, oval, and other shapes along the shape of a subject. With the AEC, the CPU 401 detects the radiation dose of the radiation irradiation in the lighting fields 150 by reading the outputs of the plurality of the pixels for radiation detection disposed in the lighting fields 150 during radiation irradiation. The imaging pixel outputs in the lighting fields 150 are equivalent to the resultant radiation dose.

The lighting fields 150 to be used to detect the radiation dose can be optionally selected according to conditions such as the imaging portion. The present embodiment will be described below centering on an example where the lighting fields 1501, 1502, and 1503 are selected from the plurality of the lighting fields 150 in FIG. 3A, as a lighting field group. The selection of the lighting fields is determined by the UI control unit 430 based on the contents of a user instruction input via the operation unit 431.

The drive unit 221 is configured to supply drive signals to the driving target pixels via the plurality of the drive lines 104 according to control signals from the control unit 225. According to the present embodiment, the drive signals are used to turn ON the switching elements included in the driving target pixels. The switching element of each pixel is turned ON by a high-level signal and turned OFF by a low-level signal. Therefore, this high-level signal is referred to as a drive signal. When the drive signal is supplied to a pixel, the signal accumulated in the conversion element of the pixel becomes ready to be read by a reading unit 222.

One of the main electrodes of a conversion element 102 is connected to one of the main electrodes of a switching element 103, and the other electrode of the conversion element 102 is connected to a bias line 108. The bias line 108 extends in the column direction and is connected to the other electrodes of a plurality of the conversion elements 102 arranged in the column direction. The bias line 108 is supplied with a bias voltage Vs from a power source unit 226. The other electrodes of the main electrodes of the switching elements 103 of the plurality of the imaging pixels 101 forming one column are connected to the corresponding one column signal line 106. Control electrodes of the switching elements 103 of the plurality of the imaging pixels 101 forming one row are connected to the corresponding one drive line 104.

The plurality of the column signal lines 106 is connected to the reading unit 222. The reading unit 222 includes a plurality of detection units 132, a multiplexer 134, and an analog digital converter (ADC) 136. Each of the plurality of the column signal lines 106 is connected to the corresponding one detection unit 132 of the plurality of the detection units 132 in the reading unit 222. This means that one column signal line 106 corresponds to one detection unit 132. Each of the detection units 132 includes, for example, a differential amplifier. The multiplexer 134 selects the plurality of the detection units 132 in a predetermined order and then supplies the signal output from the selected detection unit 132 to the ADC 136. The ADC 136 converts the supplied analog signal into a digital signal and then outputs the digital signal.

One of the main electrodes of the conversion element 122 is connected with one of the main electrodes of the switching element 123, and the other electrode of the conversion element 122 is connected with the bias line 108. The other main electrode of the switching element 123 is electrically connected to the detection signal line 125. The control electrodes of the switching elements 123 are electrically connected to drive lines 124. The radiation imaging apparatus 10 includes a plurality of the detection signal lines 125. Each of the detection signal lines 125 is connected with one or a plurality of the detection pixels 121 for dose detection. The drive lines 124 are driven by a drive unit 241. Each of the drive lines 124 is connected with one or a plurality of the detection pixels 121 for dose detection.

The drive unit 241 is configured to supply drive signals to the driving target pixels via the plurality of the drive lines 104 according to the control signals from the control unit 225. When a pixel is supplied with the drive signal, the signal accumulated in the conversion element of the pixel becomes ready to be read by the read unit 242.

The detection signal lines 125 are connected to the reading unit 242 (AEC reading unit). The reading unit 242 includes a plurality of detection units 142, a multiplexer 144, and an ADC 146. Each of the plurality of the detection signal lines 125 is connected to the corresponding detection unit 142 out of the plurality of the detection units 142 in the reading unit 242. Each of the detection signal lines 125 corresponds to one detection unit 142. The detection unit 142 includes, for example, a differential amplifier. The multiplexer 144 selects the plurality of the detection units 142 in a predetermined order and then supplies the signal output from the selected detection unit 142 to the ADC 146. The ADC 146 converts the supplied signal into a digital signal and then outputs the digital signal.

The output of the ADC 146 in the reading unit 242 is supplied to a signal processing unit 224 and processed by the signal processing unit 224. The signal processing unit 224 outputs information about the radiation irradiation on the radiation imaging apparatus 10 based on the output of the ADC 146 in the reading unit 242.

The signal processing unit 224 acquires information about the radiation dose incident on the detection pixels 121 based on an electrical signal generated by the detection pixels 121 according to the radiation irradiation. The signal processing unit 224 may generate a signal as a result of subjecting the detection result of the detection pixels 121 to digital signal processing. The signal processing unit 224 detects the start of the radiation irradiation on the radiation imaging apparatus 10 based on the generated signal. Alternatively, the signal processing unit 224 calculates the radiation dose and the cumulative dose (attained dose) based on the generated signal.

The control unit 225 controls the operations of the drive units 221 and 241 and the reading units 222 and 242. The control unit 225 including a CPU and memories (ROM and RAM) executes programs stored in the memories to implement diverse processing.

The control unit 225 controls the drive unit 221 and the reading unit 222 based on the information from the signal processing unit 224. The control unit 225 controls, for example, the start and stop of the exposure (accumulation of electric charges in the imaging pixels 101) based on the information from the signal processing unit 224. The control unit 225 acquires, for example, information about the radiation dose incident on the detection pixels 121 via the signal processing unit 224, and determines whether to stop the radiation irradiation. The control unit 225 controls the drive unit 241 independently of the drive unit 221 to read only the signals of the detection pixels 121. Therefore, the control unit 225 can acquire radiation dose information based on the outputs of the detection pixels 121 even during accumulation of electric charges in the imaging pixels 101.

The radiation imaging apparatus 10 includes a communication unit 227 for performing communication with the control apparatus 400. The communication unit 227 includes either one or both of a wired communication unit and a wireless communication unit. The communication unit 227 transmits information output from the control unit 225 to the control apparatus 400 via the wired communication unit or the wireless communication unit. For example, the communication unit 227 outputs information about whether to stop the radiation irradiation determined by the control unit 225, to the control apparatus 400.

<Early Stop Processing>

Figure 5:
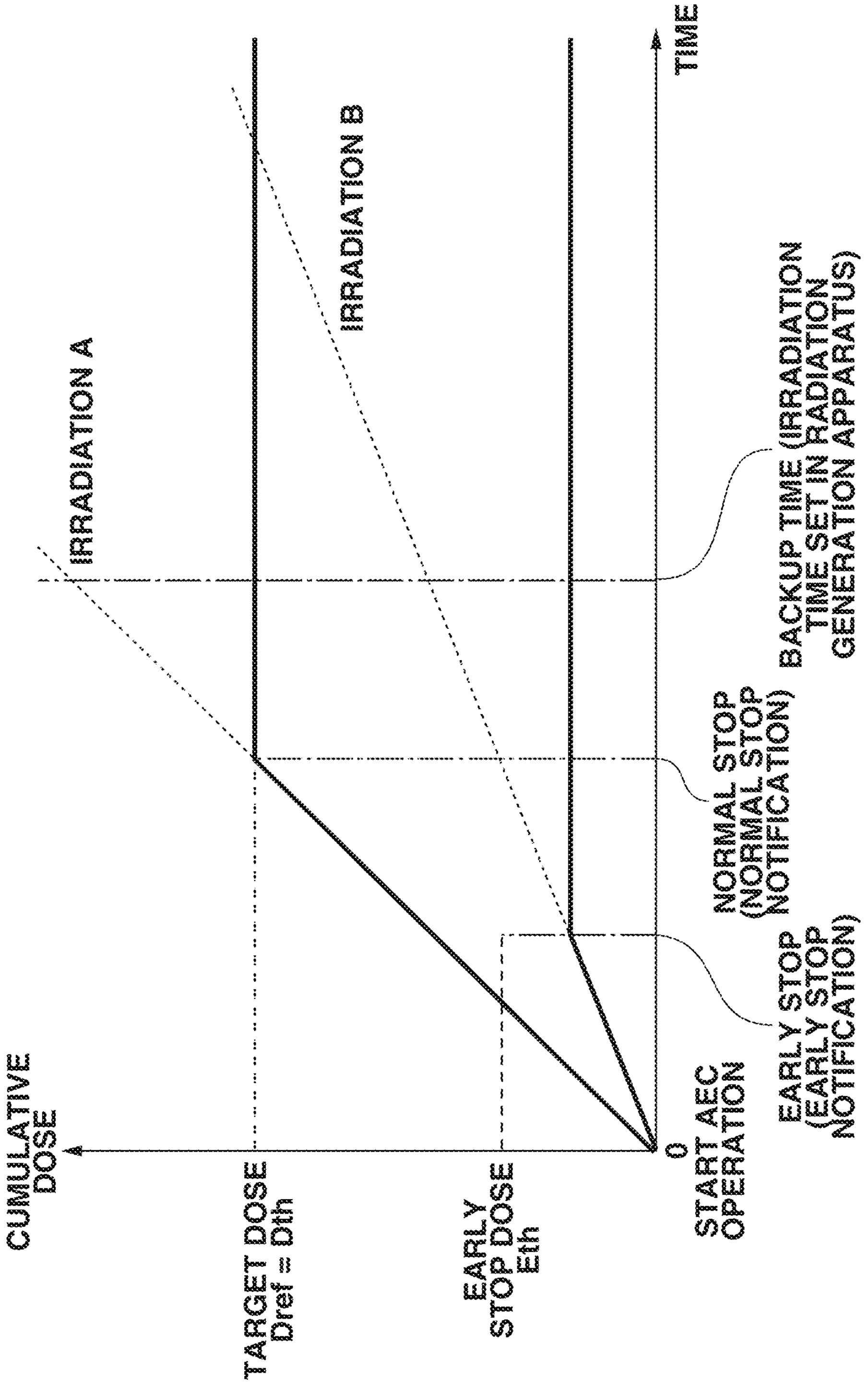
FIG. 5 illustrates early stop processing.

FIG. 5 illustrates early stop processing. FIG. 5 illustrates a relation between a radiation dose (cumulative attained dose) D assigned to the vertical axis and time (elapsed time) assigned to the horizontal axis.

In the radiation imaging, it is necessary to suitably set irradiation time Bt according to the target radiation dose and the intensity of radiation to be radiated (dose rate). When the set irradiation time Bt (backup time) is fixed at the position illustrated in FIG. 5, an irradiation A having a large cumulative dose increase per unit time can reach the target radiation dose before the set irradiation time Bt. On the other hand, an irradiation B having a small cumulative dose increase per unit time cannot reach the target radiation dose before the set irradiation time Bt.

Conventionally, the AEC is known as a technique for stopping radiation irradiation at a target radiation dose for radiation irradiation that reaches the target radiation dose before set irradiation time, like the irradiation A. This technique enables restricting the exposed dose of a test subject. Referring to FIG. 5, the use of the AEC enables stopping the dose increase drawn by the dotted line (radiation A) at the position of the target radiation dose drawn by the solid line.

The present embodiment performs a different technique from this technique. More specifically, the present embodiment performs early stop processing for early stopping the radiation irradiation that does not reach the target radiation dose before the set irradiation time (radiation B).

The present embodiment performs the above-described processing in such a case that the target radiation dose is not reached even after the radiation irradiation is performed till the backup time because of insufficient radiation irradiation, resulting in re-imaging. More specifically, determining whether to stop the radiation irradiation based on the backup time and the target radiation dose enables early stopping the radiation irradiation to restrict useless exposure to the subject. The use of the early stop processing enables stopping the increase in the radiation dose of the irradiation B drawn with the dotted line in FIG. 5, as drawn with the solid line.

The early stop processing is implemented based on threshold value conditions using time information Etim (timing information) for the early stop determination and threshold value information Eth for the early stop determination. More specifically, the CPU 401 performs the early stop processing when the cumulative dose for the time information Etim for the early stop determination is less than the threshold value information Eth for the early stop determination. For the time information Etim for the early stop determination, X % (0% to 100%, e.g., 30%) of the backup time Bt is used. For the threshold value information Eth for the early stop determination, Y % (0% to 100%, e.g., 30%) of a target radiation dose Dref is used. The starting point of the elapsed time is the start of the radiation dose detection operation, the exposure permission, the start of the accumulation operation, or the start of the radiation. The elapsed time may be monitored based on the number of read operations incremented for each dose detection operation or monitored by using the timer included in the radiation imaging apparatus 10.

Although, in the above-described example, the CPU 401 determines whether the radiation irradiation is insufficient based on the backup time and the target radiation dose, the CPU 401 may perform the determination based on an original determination value set in the radiation imaging apparatus 10. Although the CPU 401 determines whether the radiation dose detected at the determination timing after a set time period has elapsed satisfies a detection criterion, the CPU 401 may perform the determination based on the inclination of the radiation dose variation over time. The criterion for determining the inclination of the radiation dose variation may be set based on the target radiation dose and the backup time, or may be based on an original criterion set in the radiation imaging apparatus 10. If the CPU 401 cannot acquire information about the backup time from the control apparatus 400, the CPU 401 may determine the timing for performing the determination based on a cumulative time setting in the radiation imaging apparatus 10.

<Imaging Control>

Figure 6:
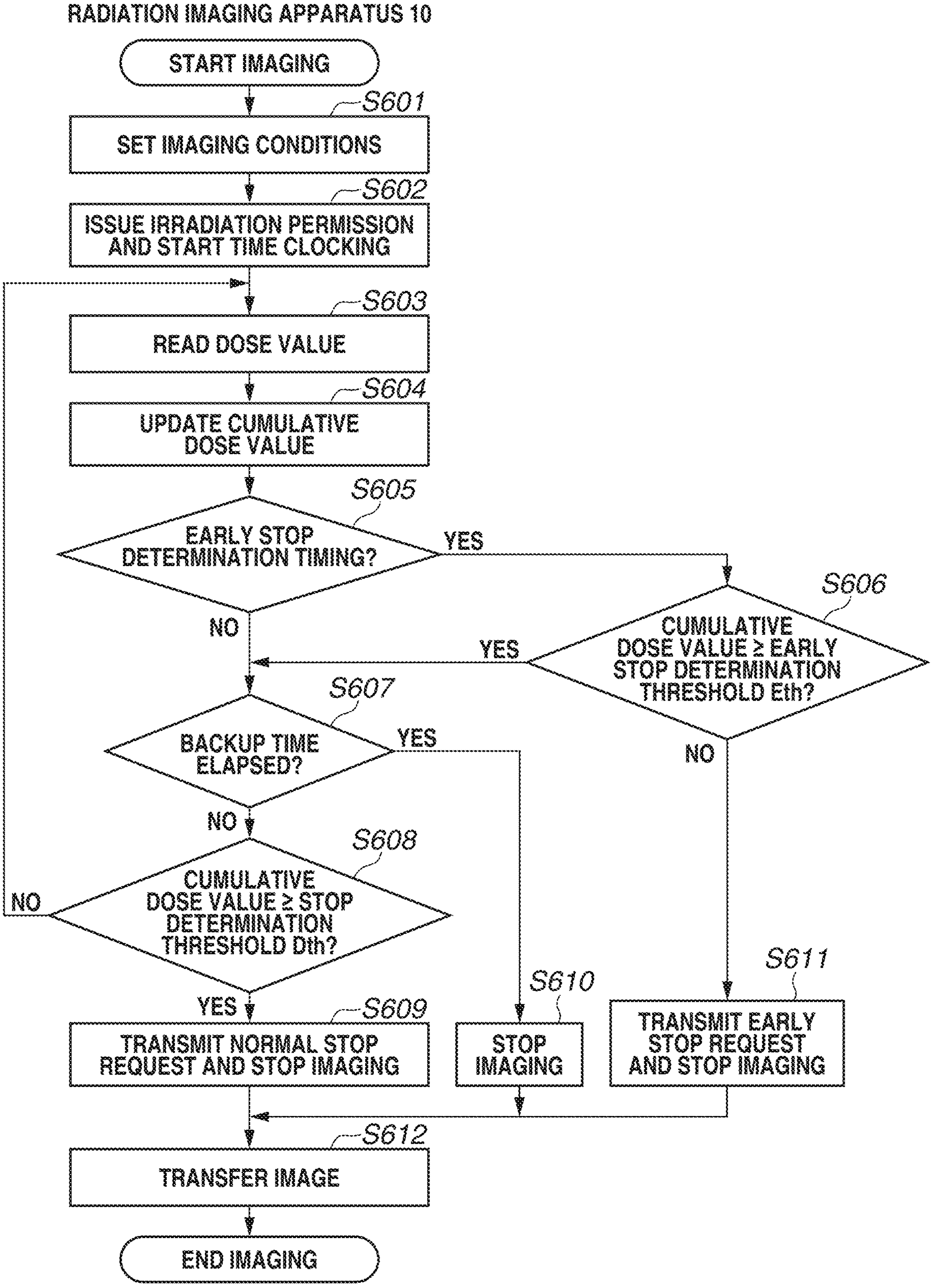
FIG. 6 is a flowchart illustrating control of the radiation imaging apparatus.

FIG. 6 is a flowchart illustrating control of the radiation imaging apparatus 10. In step S601, the control unit 225 of the radiation imaging apparatus 10 communicates with the control apparatus 400 and sets various kinds of information. Examples of the set information include imaging condition information (irradiation condition information) include the X-ray tube voltage and X-ray tube current of the radiation tube, the target radiation dose Dref (attained cumulative dose), and a stop determination threshold value Dth. Examples of the set information also include the set irradiation time (backup time) Bt, the time information Etim for the early stop determination, the threshold value information Eth for the early stop determination, and the lighting field information (Region Of Interest (ROI) information).

In step S602, the control unit 225 performs processing for changing an exposure permission signal from the Lo level to the Hi level as a response to a start request signal received from the control apparatus 400.

The control unit 225 also controls the drive unit 221 to start accumulating electric charges in the imaging pixels 101. The control unit 225 starts time clocking by using the internal timer. The radiation imaging is started in this way. Processing after starting the radiation imaging will be described below.

In step S603, the control unit 225 drives the drive unit 241 to acquire the dose values of the detection pixels 121 corresponding to the lighting field information.

In step S604, the control unit 225 performs processing for accumulating the dose values and processing for updating the cumulative dose value.

In step S605, the control unit 225 determines whether the timing indicated by the internal timer reaches the timing indicated by the time information Etim for the early stop determination. When the timing of the internal timer reaches the timing for the early stop determination (YES in step S605), the processing proceeds to step S606. When the timing of the internal timer does not reach the timing for the early stop determination (NO in step S605), the processing proceeds to step S607.

In step S606, the control unit 225 determines whether the cumulative dose value is equal to or larger than the early stop determination threshold value Eth. The control unit 225 determines whether the timing of the internal timer reaches the timing indicated by the time information Etim for the early stop determination (predetermined timing). When the cumulative dose value is equal to or larger than the threshold value Eth for the early stop determination as a predetermined condition (YES in step S606), the processing proceeds to step S607. When the cumulative dose value is less than the threshold value Eth for the early stop determination (NO in step S606), the processing proceeds to step S611.

In step S611, the control unit 225 transmits an early stop request to the control apparatus 400. This request (notification) may be supplied with a flag so as to be preferentially processed over other communications. Then, the control unit 225 controls the drive unit 221 to read signals from the imaging pixels 101 and completes the imaging. In step S612, the signals read from the imaging pixels 101 are transferred to the control apparatus 400 as a radiation image. This radiation image may be supplied with information indicating that the radiation is early stopped.

In step S607, the control unit 225 determines whether the clocking timing reaches the set irradiation time Bt. When the clocking timing reaches the set irradiation time Bt (YES in step S607), the processing proceeds to step S610. When the clocking timing does not reach the set irradiation time Bt (NO in step S607), the processing proceeds to step S608.

In step S610, the control unit 225 controls the drive unit 221 to read signals from the imaging pixels 101 and completes the imaging. In step S612, the signals read from the imaging pixels 101 are transferred to the control apparatus 400 as a radiation image. This radiation image may be supplied with information indicating that the radiation is stopped at the set irradiation time Bt.

In step S608, the control unit 225 compares the cumulative dose value with the stop determination threshold value Dth. When the cumulative dose value is equal to or larger than the stop determination threshold value Dth (YES in step S608), the processing proceeds to step S609. When the cumulative dose value is less than the stop determination threshold value Dth (NO in step S608), the processing returns to step S603. In step S603, the control unit 225 acquires an additional dose value.

In step S609, the control unit 225 transmits a normal stop request (AEC stop request) to the control apparatus 400. Then, the control unit 225 controls the drive unit 221 to read signals from the imaging pixels 101 and completes the imaging. In step S612, the signals read from the imaging pixels 101 are transferred to the control apparatus 400 as a radiation image. This radiation image may be supplied with information indicating that the radiation is normally stopped.

The radiation image transferred to the control apparatus 400 is displayed on the display unit 432 for diagnosis or is used for the radiation dose management.

The first embodiment has been described above centering on an example where the radiation imaging apparatus 10 performs the determination processing based on the radiation dose. A second embodiment will be described below centering on an example where the control apparatus 400 performs the determination processing based on the radiation dose. The configuration of the second embodiment is similar to that of the first embodiment except for the portions related to the above-described features. Similar components are assigned the same reference numerals, and details descriptions thereof will be omitted.

<Imaging Control>

Figure 8:
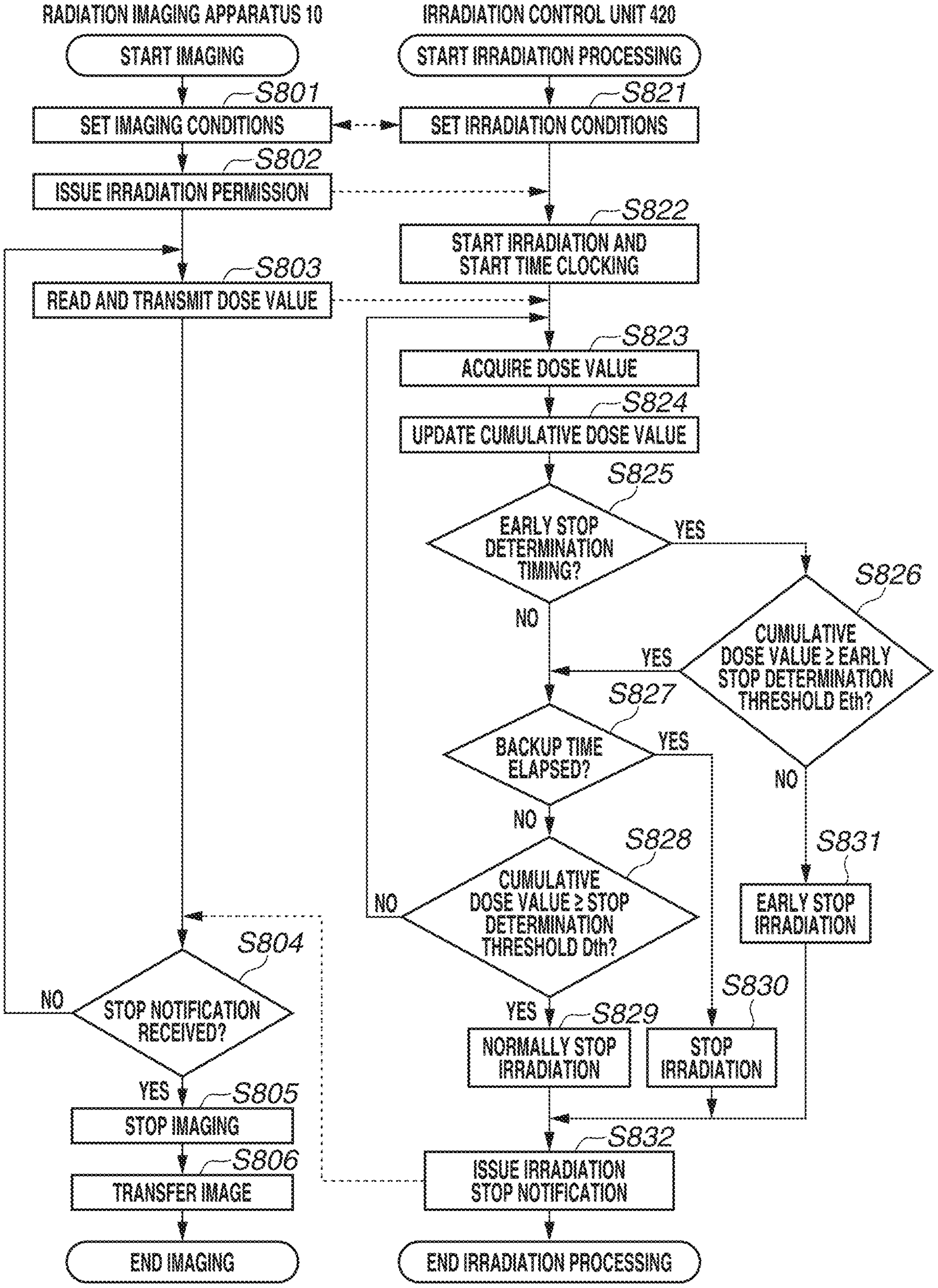
FIG. 8 is a flowchart illustrating control of a radiation imaging apparatus and an irradiation control unit according to other embodiments.

FIG. 8 is a flowchart illustrating control of the radiation imaging apparatus 10 and the irradiation control unit 420 according to other embodiments. In step S801, the control unit 225 of the radiation imaging apparatus 10 communicates with the control apparatus 400 including the irradiation control unit 420 to set various kinds of information. Accordingly, the irradiation control unit 420 sets irradiation conditions in step S821.

In step S802, the control unit 225 performs processing for changing the exposure permission signal from the Lo level to the Hi level as a response to the start request signal received from the control apparatus 400.

In response to this processing, the irradiation control unit 420 starts the radiation irradiation and starts time clocking by using the internal timer in step S822. The control unit 225 controls the drive unit 221 to start accumulating electric charges in the imaging pixels 101.

In step S803, the control unit 225 drives the drive unit 241 to acquire the dose values of the detection pixels 121 corresponding to the lighting field information and transmits the dose values to the irradiation control unit 420.

In step S804, the control unit 225 determines whether a stop notification is received. When the stop notification is not received (NO in step S804), the control unit 225 repeats the processing in step S803 until the stop notification is received.

Meanwhile, in step S823, the irradiation control unit 420 performs processing for acquiring the radiation dose values transmitted from the radiation imaging apparatus 10.

In step S824, the irradiation control unit 420 performs processing for accumulating the radiation dose values and performs processing for updating the cumulative dose value.

In step S825, the irradiation control unit 420 determines whether the timing indicated by the internal timer reaches the timing indicated by the time information Etim for the early stop determination. When the timing of the internal timer reaches the timing for the early stop determination (YES in step S825), the processing proceeds to step S826. When the timing of the internal timer does not reach the timing for the early stop determination (NO in step S825), the processing proceeds to step S827.

In step S826, the irradiation control unit 420 determines whether the cumulative dose value is equal to or larger than the early stop determination threshold value Eth. The irradiation control unit 420 determines whether the timing of the internal timer reaches the timing indicated by the time information Etim for the early stop determination. When the cumulative dose value is equal to or larger than the early stop determination threshold value Eth (YES in step S826), the processing proceeds to step S827. When the cumulative dose value is less than the early stop determination threshold value Eth (NO in step S826), the processing proceeds to step S831.

In step S831, the irradiation control unit 420 early stops the radiation irradiation. Then, the processing proceeds to step S832.

In step S827, the irradiation control unit 420 determines whether the clocking timing reaches the set irradiation time Bt. When the clocking timing reaches the set irradiation time Bt (YES in step S827), the processing proceeds to step S830. When the clocking timing does not reach the set irradiation time Bt (NO in step S827), the processing proceeds to step S828.

In step S830, the irradiation control unit 420 stops the radiation irradiation. Then, the processing proceeds to step S832.

In step S828, the irradiation control unit 420 compares the cumulative dose value with the stop determination threshold value Dth. When the cumulative dose value is equal to or larger than the stop determination threshold value Dth (YES in step S828), the processing proceeds to step S829. When the cumulative dose value is less than the stop determination threshold value Dth (NO in step S828), the processing returns to step S823. In step S823, the irradiation control unit 420 acquires the additional dose value.

In step S829, the irradiation control unit 420 normally stops the radiation irradiation. Then, the processing proceeds to step S832.

In step S832, the irradiation control unit 420 transmits a notification indicating that the radiation irradiation is stopped to the radiation imaging apparatus 10.

When the control unit 225 receives the stop notification (YES in step S804), the processing proceeds to step S805.

In step S805, the control unit 225 controls the drive unit 221 to read signals from the imaging pixels 101 and completes the imaging.

In step S806, the control unit 225 transmits a radiation image based on the signals from the imaging pixels 101 to the control apparatus 400.

The first embodiment has been described above centering on an example where the delay time since the exposure permission till the radiation irradiation is not taken into consideration. A third embodiment will be described below centering on an example where the delay time since the exposure permission till the radiation irradiation is taken into consideration. The configuration of the third embodiment is similar to that of the first embodiment except for the portions related to the above-described features. Similar components are assigned the same reference numerals, and details descriptions thereof will be omitted.

<Early Stop Processing: Delay Time Correction>

Figure 9:
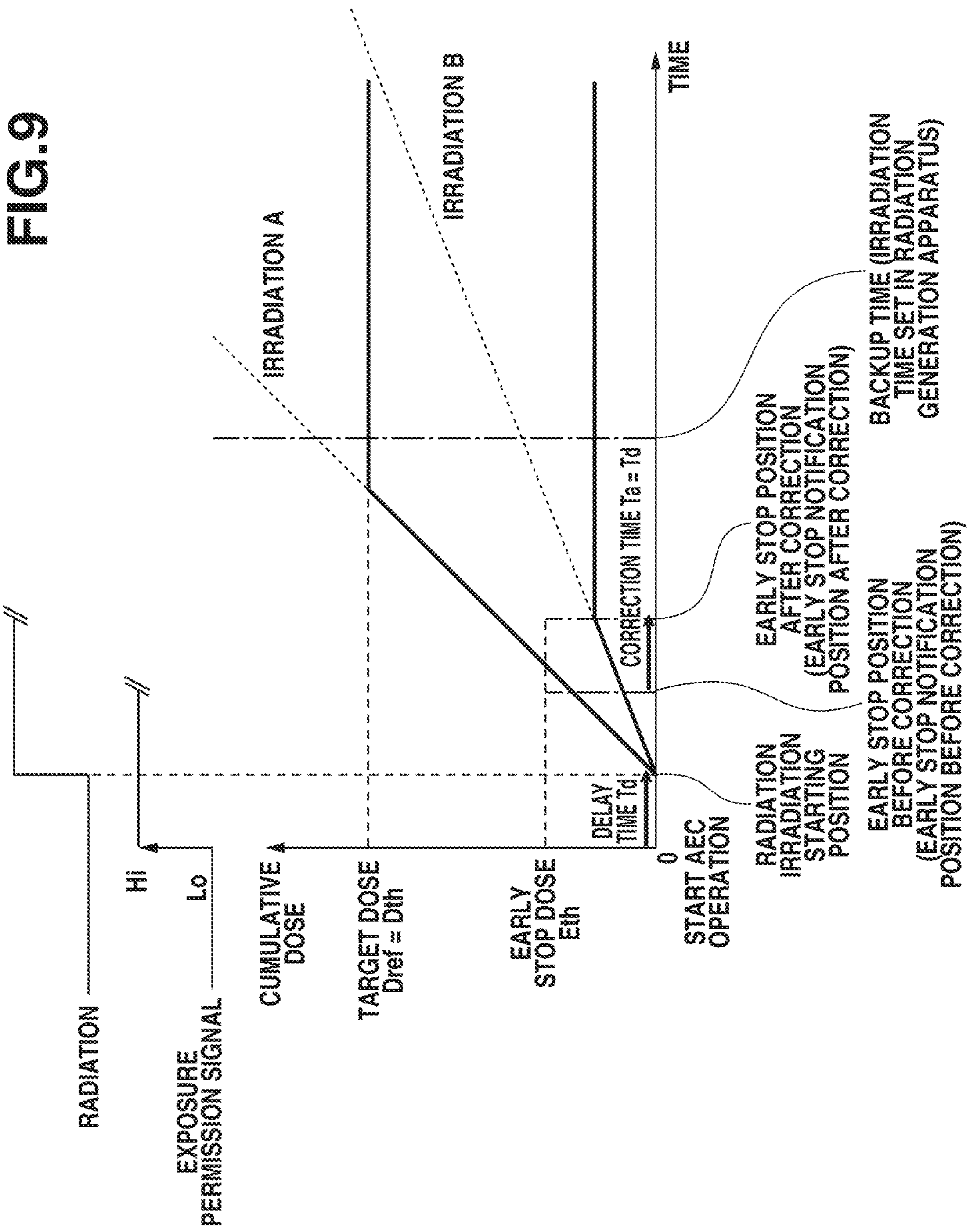
FIG. 9 illustrates an early stop in consideration of a radiation delay time.

FIG. 9 illustrates the early stop processing in consideration of the delay time of the radiation irradiation.

In the radiation imaging system 1, a delay time Td may arise during the time period since the irradiation control unit 420 receives the exposure permission signal transmitted from radiation imaging apparatus 10 till the radiation generation unit 300 generates a radiation. The delay time Td is caused by a response delay specific to the radiation imaging system 1, and varies according to the imaging condition information (irradiation condition information) including the X-ray tube voltage (kV) and the X-ray tube current (mA) in the radiation tube.

The delay time Td is obtained by measuring the time period between the rising time of the exposure permission signal transmitted from the radiation imaging apparatus 10 and the rising time of the radiation. The delay time Td includes a communication delay time arising when the communication unit 227 and the imaging control unit 410 are interposed. This measurement value is obtained by using, for example, an oscilloscope. The delay time Td is characteristically different for each of the radiation conditions including the X-ray tube voltage (kV), the X-ray tube current (mA), and an upper-limit irradiation time (ms). Therefore, preferably, the delay time Td is set as a parameter corresponding to each radiation condition. The delay time Td to be used for correction according to the present embodiment may be based on values detected and calculated from past imaging. For example, the control unit 225 can calculate the delay time Td by obtaining the cumulative dose value and the time information for at least two points since the rising time of the exposure permission signal, and then calculating an approximated straight line.

Also, the delay time Td to be used for correction according to the present embodiment may be obtained by measuring the rising time of the radiation based on the rising edge of the exposure permission signal input to the radiation generation unit 300. However, this method premises that different apparatuses in the radiation imaging system 1 are in time synchronization with each other. Further, adjustment is separately required in consideration of a communication delay time arising when the imaging control unit 410 is interposed. For example, the control unit 225 acquires time information T1 with which the radiation imaging apparatus 10 permits the radiation generation unit 300 for the radiation irradiation, and time information T2 with which the radiation imaging apparatus 10 permits the radiation generation unit 300 for the radiation irradiation via the communication unit 227 and the imaging control unit 410. Then, the control unit 225 calculates a communication delay time ΔT(T2−T1) based on the two pieces of information. The control unit 225 adjusts the communication delay by adding the calculated communication delay time ΔT to the delay time Td.

If a delay time arises, the control unit 225 may determine an insufficient radiation irradiation regardless of sufficient radiation irradiation, possibly resulting in an erroneous determination. As illustrated in FIG. 9, the radiation irradiation is started after the delay time Td has elapsed since the exposure permission signal is changed from the Lo level to the Hi level.

In this environment, if the control unit 225 performs the determination based on the early stop dose Eth at an early stop position (early stop position before the correction) similar to that in FIG. 5, a cumulative dose lower than the early stop dose Eth will be measured regardless of the irradiation A having a high radiation dose rate or the irradiation B having a low radiation dose rate. Therefore, early stop processing will be performed regardless of the imaging with the irradiation A or the imaging with the irradiation B. In consideration of the delay time Td in such an environment, a modification is to be made so that the imaging with the irradiation A is not early stopped, and the imaging with the irradiation B is early stopped. More specifically, the early stop position before the correction is delayed by a correction time Ta (=delay time Td) and set as the early stop position after the correction.

With such a correction, the cumulative dose for the irradiation A exceeds the early stop dose Eth at the early stop position after the correction, and the cumulative dose for the irradiation B underruns the early stop dose Eth at the early stop position after the correction.

<Radiation Delay Time Adjustment Control>

Figure 10:
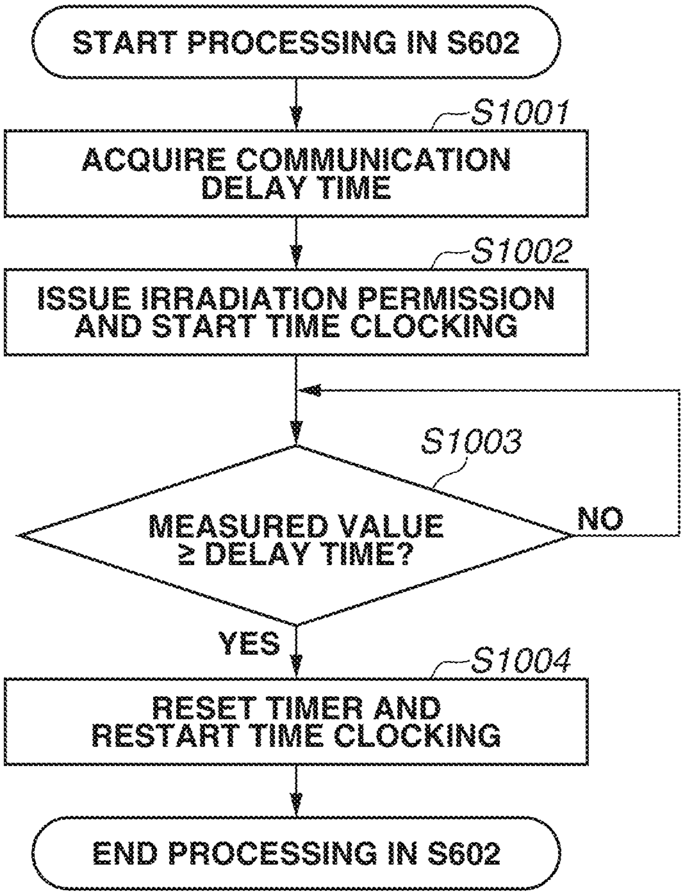
FIG. 10 is a flowchart illustrating control in step S602 according to a third embodiment.

FIG. 10 is a flowchart illustrating control in step S602 according to the second embodiment.

In step S1001, the control unit 225 acquires information about the delay time Td in the environment of the radiation imaging system 1.

In step S1002, the control unit 225 changes the exposure permission signal from the Lo level to the Hi level to issue an irradiation permission.

In step S1003, the control unit 225 compares the measured value of the internal timer with the delay time Td. When the measured value of the internal timer is smaller than the delay time Td (measured value<delay time Td) (NO in step S1003), the control unit 225 continues the measurement with the internal timer. When the measured value of the internal timer is equal to or larger than the delay time Td (measured value≥delay time Td) (YES in step S1003), the processing proceeds to step S1004.

In step S1004, the control unit 225 resets the internal timer to 0 and then restarts time clocking with the internal timer.

With the above-described processing, the early stop position before the correction can be delayed by the correction time Ta (=delay time Td) and set as the early stop position after the correction.

Figure 11:
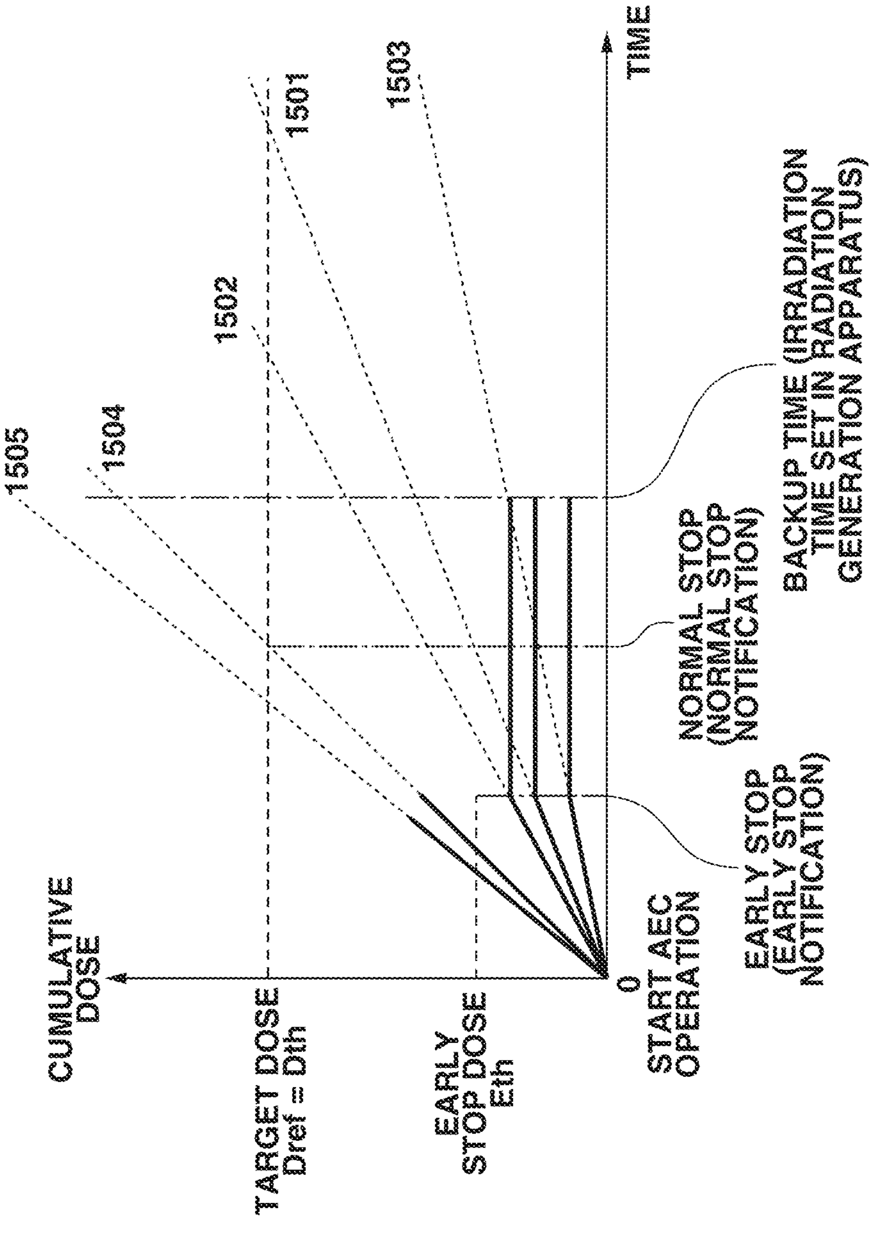
FIG. 11 illustrates increase trends of cumulative doses in different lighting fields.

According to a fourth embodiment, the control unit 225 selects three different lighting fields 1501, 1502, and 1503 and detects the radiation doses. FIG. 11 illustrates increase trends of the cumulative doses in different lighting fields. As illustrated in FIG. 11, the control unit 225 performs the early stop processing when the Etim-based cumulative dose is less than Eth in all of the three selected lighting fields. For example, under the influence of an implant, if one of the selected lighting fields detects an Etim-based cumulative dose of less than Eth, and other selected lighting fields detect an Etim-based cumulative dose of Eth or larger, imaging may have been normally completed. If the early stop processing is performed in such a case, re-imaging is required, and useless exposure to the subject increases. To avoid this, the present embodiment performs the early stop processing when the early stop processing is determined to be necessary in a plurality of lighting fields out of the selected lighting fields. This enables preventing useless exposure to the subject.

The present embodiment has been described above centering on a case where the early stop processing is performed when the Etim-based cumulative dose is less than Eth in all of the three selected lighting fields 1501, 1502, and 1503. However, the present disclosure is not limited thereto. More specifically, the control unit 225 may perform the early stop processing when the cumulative dose is less than Eth in some lighting fields of the plurality of the selected lighting fields. For example, two lighting fields 1501 and 1502 out of the three selected lighting fields are focused. If the two lighting fields 1501 and 1502 detect an Etim-based cumulative dose of less than Eth, the control unit 225 may perform the early stop processing even if the lighting field 1503 detects an Etim-based cumulative dose of Eth or larger.

As described above, according to the present embodiment, the control unit 225 performs the determination of the early stop processing based on a combination of the cumulative doses in a plurality of lighting fields. This enables performing suitable early stop processing based on the imaging conditions.

The fourth embodiment has been described above centering on an example where the control unit 225 determines whether to perform the early stop processing based on the lighting fields selected by the user. A fifth embodiment will be described below centering on an example where deselected lighting fields are also used to determine whether to perform the early stop processing. The configuration of the fifth embodiment is similar to that of the fourth embodiment except for the portions related to the above-described features. Similar components are assigned the same reference numerals, and details descriptions thereof will be omitted.

<Early Stop Processing>

Figure 12A:
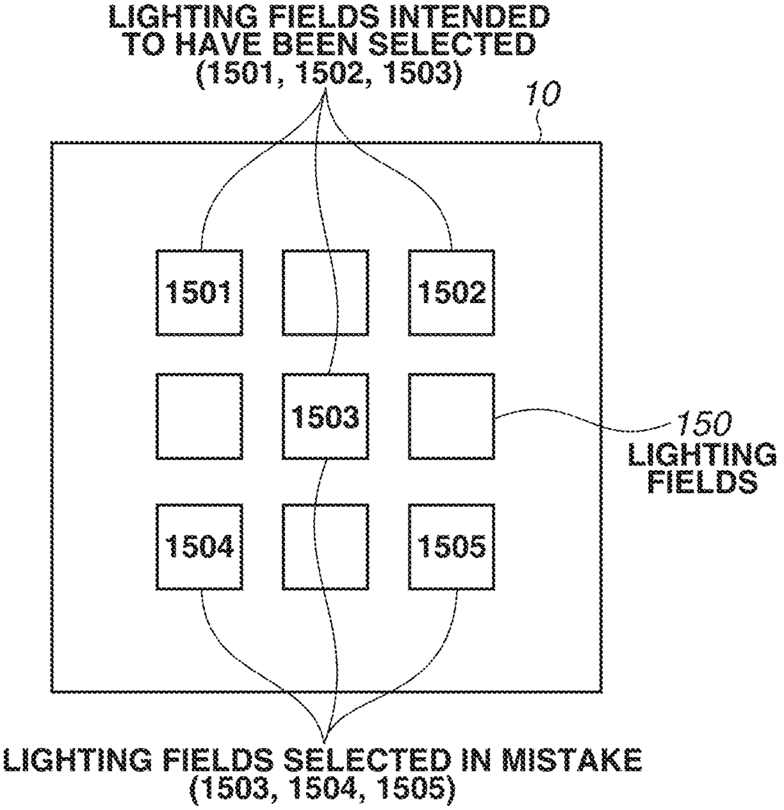
FIG. 12A illustrates a wrong setting of lighting fields.
Figure 12B:
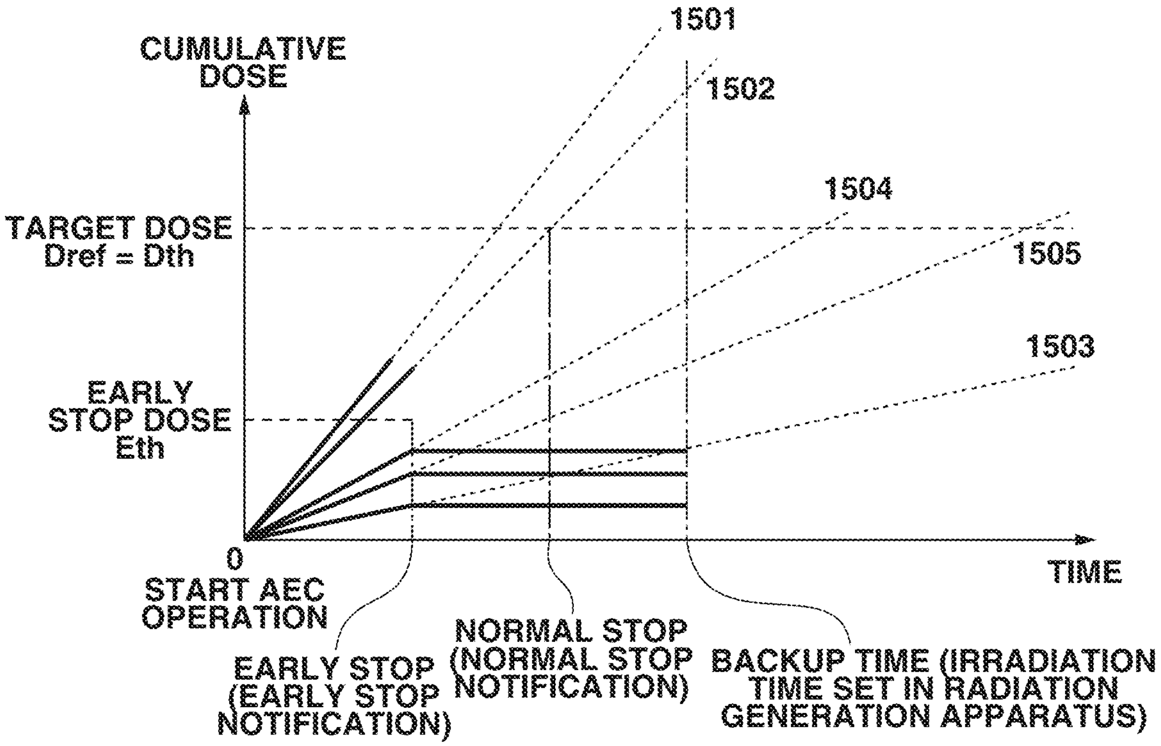
FIG. 12B illustrates increase trends of cumulative doses in different lighting fields.

The present embodiment will be described below centering on an example case where the user selects the lighting fields 1503, 1504, and 1505 by mistake in the imaging where the lighting fields 1501, 1502, and 1503 needs to be selected from among the lighting fields 150 in FIG. 12A. FIG. 12A illustrates a wrong setting of the lighting fields 150. Such a mistake can occur when the installation orientation of the radiation imaging apparatus 10 is recognized by mistake. The present embodiment provides a function of suitably performing the early stop processing even if such a mistake occurs. More specifically, the control unit 225 secondarily determines whether to perform the early stop processing for a combination of the selected lighting fields and a combination of highly associated lighting fields. Assume an example case where, as illustrated in FIG. 12B, the lighting fields 1501 and 1502 detect an Etim-based cumulative dose of Eth or larger even if the actually selected lighting fields 1503, 1504, and 1505 detect an Etim-based cumulative dose of less than Eth. In this case, the imaging intended by the user may have been suitably completed. FIG. 12B illustrates increase trends of the cumulative doses in different lighting fields. In such a case, it is desirable not to perform the early stop determination. Desirably, the control unit 225 performs the early stop processing if the Etim-based cumulative dose is less than Eth not only in the selected lighting fields 1503, 1504, and 1505 but also in the deselected lighting fields 1501 and 1502.

The above-described descriptions include a combination of selected lighting fields rotated by 180 degrees as an example combination of selected lighting fields and an example combination of highly associated lighting fields. However, an example combination of selected lighting fields and an example combination of highly associated lighting fields are not limited thereto. For example, selected lighting fields may be rotated by 90 degrees, rotated by 270 degrees, or subjected to mirror image inversion. The cumulative dose values in all of the lighting fields may be referenced or desirably the cumulative dose values only in highly associated lighting fields may be referenced to determine whether to perform the early stop processing. Selecting some of the lighting fields in which the cumulative dose value is referenced enables reducing the number of processes, contributing to the improvement of the response performance.

As described above, the present embodiment enables preventing the occurrence of useless early stop processing even if the user selects lighting fields by mistake, thus restricting the increase in the number of times of re-imaging.

The user may set whether to secondarily determine whether to perform the early stop processing for a combination of selected lighting fields and a combination of highly associated lighting fields. The user is able to input an instruction to the UI control unit 430 via the operation unit 431 to set this function to ON or OFF.

The first embodiment has been described above centering on an example where the control unit 225 determines whether to perform the early stop processing based on the lighting fields selected by the user. A sixth embodiment will be described below centering on an example where the control unit 225 determines to perform the early stop processing based on the result of the comparison between the cumulative dose information estimated from imaging protocol information and the cumulative dose information in the lighting fields actually subjected to the early stop determination. The configuration of the sixth embodiment is similar to that of the fourth embodiment except for the portions related to the above-described features. Similar components are assigned the same reference numerals, and details descriptions thereof will be omitted.

<Early Stop Processing>

Figure 13A:
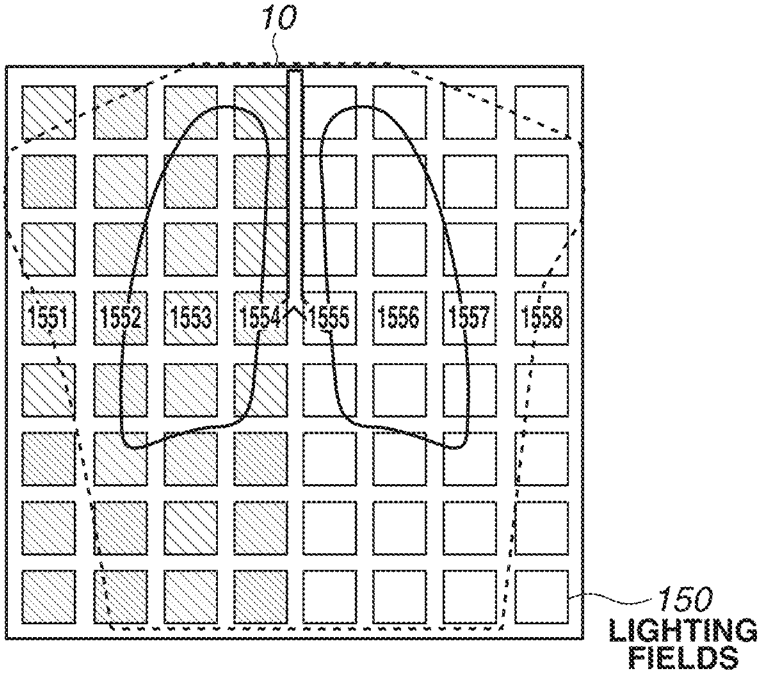
FIG. 13A illustrates subdivided lighting fields.
Figure 13B:
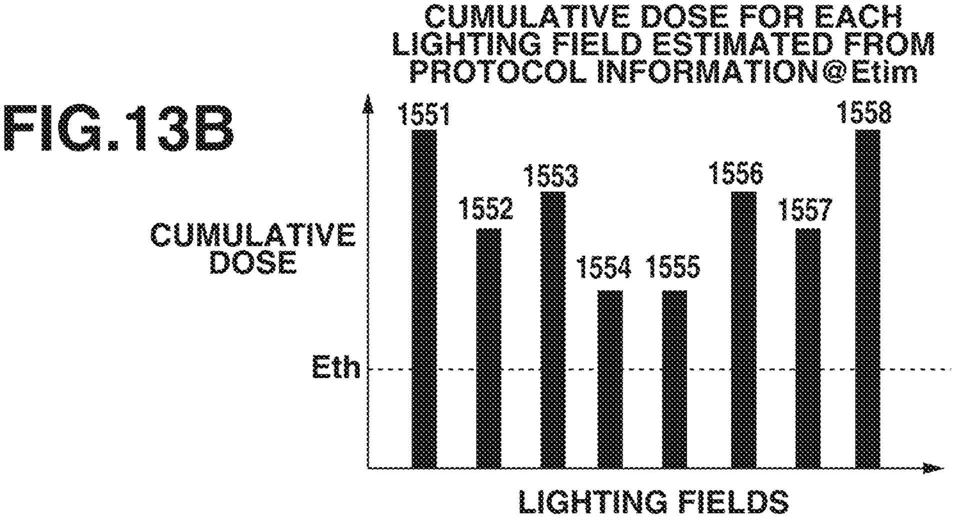
FIG. 13B illustrates cumulative doses in different lighting fields.
Figure 13C:
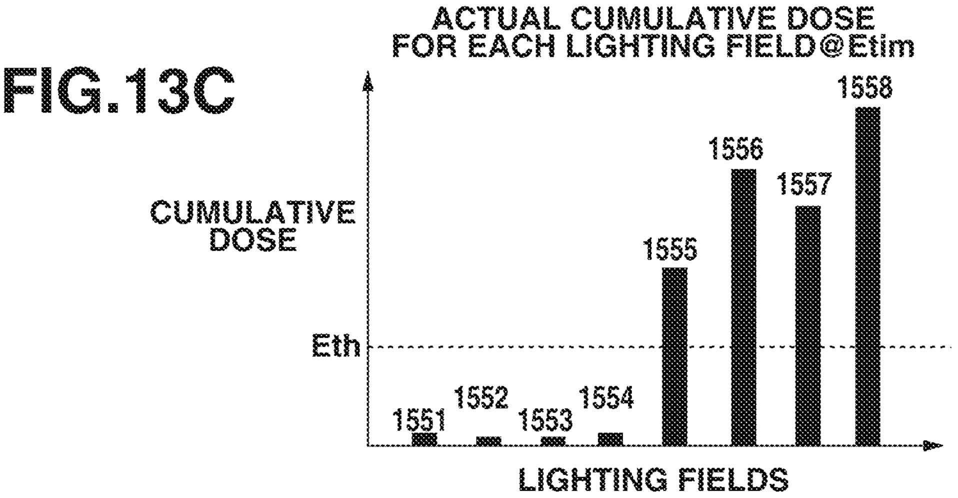
FIG. 13C illustrates cumulative doses in different lighting fields.

FIG. 13A illustrates subdivided lighting fields. FIG. 13B illustrates the cumulative doses in different lighting fields. FIG. 13C illustrates the cumulative doses in different lighting fields.

The present embodiment uses the radiation imaging apparatus 10 including 64 lighting fields arranged in an 8×8 matrix form as illustrated in FIG. 13A, and uses protocol information as imaging condition information. The number of divisions of the lighting fields may be 16×16, 32×32, or other numbers.

This protocol information enables identifying an imaging portion such as the head, chest, or abdomen. Some of imaging portions have a tendency in the magnitude of the cumulative dose for each lighting field. This tendency can be used to determine whether to perform the early stop processing.

For example, the lungs illustrated in FIG. 13A provide a cumulative dose distribution as illustrated in FIG. 13B. More specifically, lighting fields 1551 and 1558 including through-exposure regions, and lighting fields 1553 and 1556 overlapped with the lung field have a tendency of output of a relatively high cumulative dose. Lighting fields 1554 and 1555 overlapping with the mediastinal region have a tendency of output of a relatively low cumulative dose.

The above-described tendencies of the cumulative dose distribution apply to a case where the radiation irradiation is normally performed. A case where the radiation irradiation is not normally performed is not limited thereto. For example, assume a case where only the right half of the radiation imaging apparatus 10 is subjected to the radiation irradiation because of a misregistration between the radiation generation unit 300 and the radiation imaging apparatus 10, and the shaded lighting fields in FIG. 13A are not subjected to the radiation irradiation. In this case, as illustrated in FIG. 13C, the lighting fields 1555 to 1558 on the right-hand side detect the cumulative dose value for the ideal radiation irradiation, and the lighting fields on the left-hand side detect an Etim-based cumulative dose value of Eth or less. If the lungs are subjected to the ideal radiation irradiation, the horizontal profile of the cumulative dose will be symmetric as illustrated in FIG. 13B. However, if the influence of misregistration is present, the profile is not symmetric as illustrated in FIG. 13C.

In such a case, a suitable radiation image cannot be obtained even if the radiation irradiation is continued. Therefore, according to the present embodiment, if the control unit 225 determines that there is a difference from the dose distribution information estimated from the protocol, the control unit 225 performs the early stop processing.

At the time of lung imaging, the convex portions of the lung field, such as the lighting fields 1553 and 1556, may be focused. Since the radiation is likely to pass through the lung field and the cumulative dose value becomes large, two convex portions such as the lighting fields 1553 and 1556 will be present. Referring to FIG. 13C, the control unit 225 determines a failure because there is only one convex portion.

Although, in the above descriptions, the comparison is made focusing on the difference in the profile of the cumulative dose, a derivative value may be used to extract convex portions representing the features of the lung field. For example, the vicinity of the center of the lung field region provides a derivative value of 0, and the border of the lung field region provides a large derivative value. If the lighting fields 150 are more finely arranged, such a method for extracting convex portions based on a derivative value is also effective.

<Exception Processing>

If a foreign object, such as an implant is included in the body of a patient as a subject, the cumulative dose value locally decreases at the portion corresponding to the foreign object. This causes a difference between the cumulative dose value estimated from the protocol information and the actual cumulative dose value, possibly causing the early stop processing to be performed. Accordingly, the present embodiment performs exception processing to prevent the early stop processing from being performed because of a foreign object.

Figure 14:
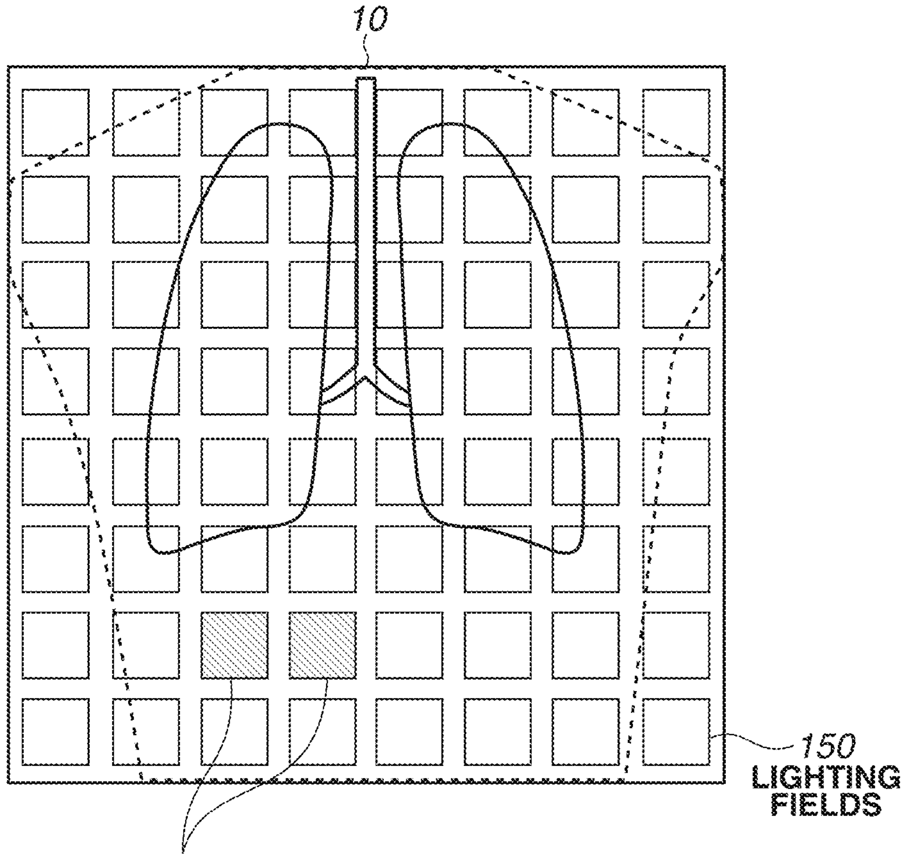
FIG. 14 illustrates a relation between lighting fields and an implant.

As illustrated in FIG. 14, assume a case where, under the influence of an implant, the lighting fields 150 locally include lighting fields (shaded lighting fields) detecting an Etim-based cumulative dose less than Eth. FIG. 14 illustrates a relation between lighting fields and an implant.

In such a case, it is assumed that only the portion including an implant locally detects a low cumulative dose relative to the cumulative dose estimated from the protocol information, and normal cumulative doses are distributed around that portion. Therefore, according to the present embodiment, the control unit 225 references a two-dimensional map of the lighting fields as illustrated in FIG. 14 to confirm the statuses of the lighting fields surrounding the lighting field locally detecting a low cumulative dose (the lighting field detecting an Etim-based cumulative dose of less than Eth). If normal cumulative doses are distributed on all four sides of the lighting field locally detecting a low cumulative dose, the control unit 225 determines that the influence of an implant is present. If the influence of an implant is present, the control unit 225 determines that normal imaging is possible and hence does not perform the early stop processing.

On the other hand, if low cumulative doses are distributed on all four sides of the lighting field locally detecting a low cumulative dose relative to the cumulative dose estimated from the protocol information, the control unit 225 does not determine that the influence of an implant is present. In this case, the control unit 225 performs the early stop processing.

As described above, if a lighting field detecting an Etim-based cumulative dose of less than Eth is surrounded by lighting fields having a cumulative dose of Eth or larger, the control unit 225 does not perform the early stop processing. On the contrary, if a lighting field detecting an Etim-based cumulative dose of less than Eth is not surrounded by lighting fields having a cumulative dose of Eth or larger, the control unit 225 compares the output estimated from the protocol information with the actual output, and, if there is a difference between the two outputs, performs the early stop processing.

This enables reducing the risk that useless imaging is stopped and then re-imaging is performed.

<Imaging Control>

Figure 15:
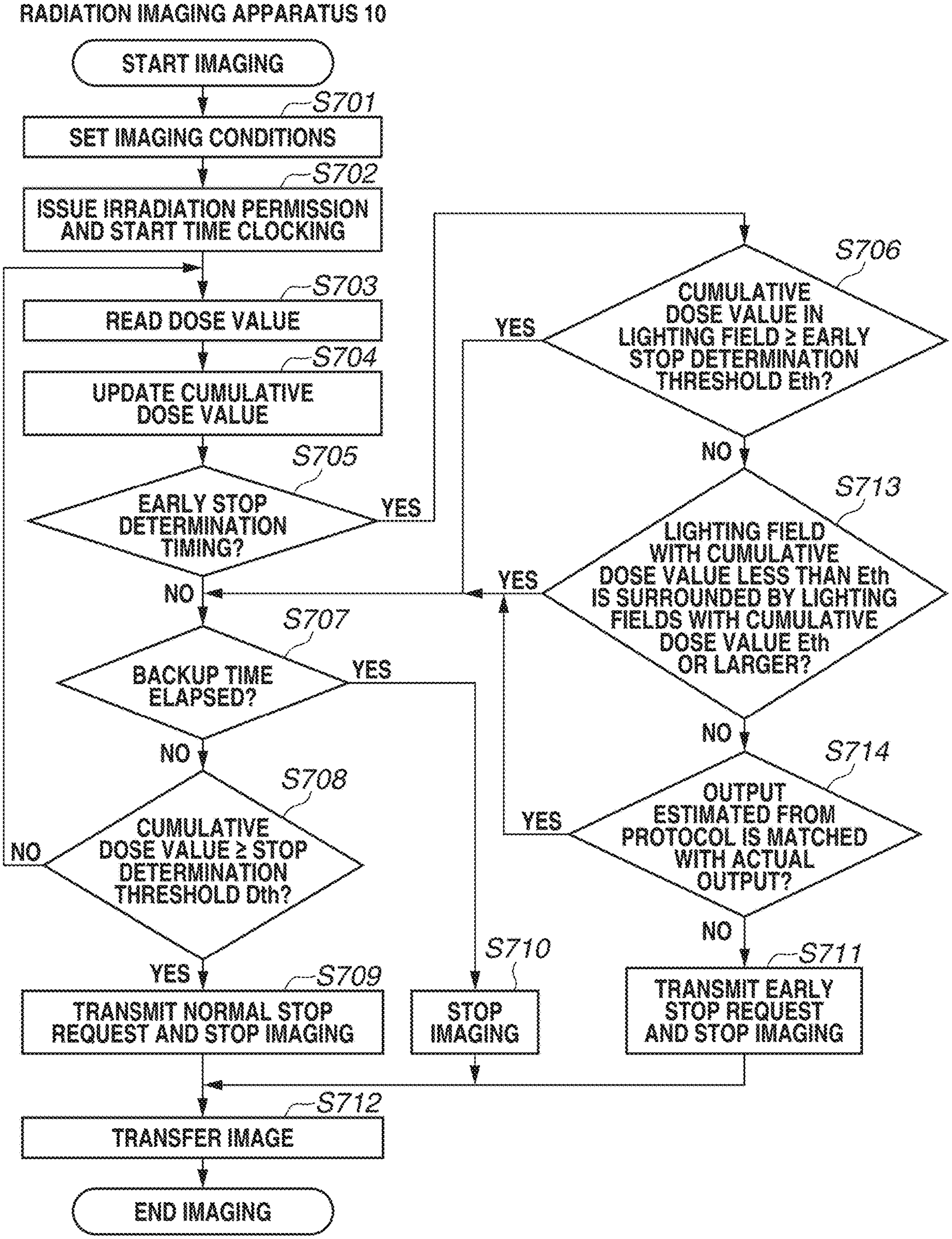
FIG. 15 is a flowchart illustrating control of the radiation imaging apparatus.

FIG. 15 is a flowchart illustrating control of the radiation imaging apparatus 10 according to the present embodiment. For processing duplicated with the processing in FIG. 6 according to the first embodiment, redundant descriptions will be omitted.

In step S706, the control unit 225 determines whether the cumulative dose value is equal to or larger than the early stop determination threshold value Eth. The control unit 225 determines whether the clocking timing reaches the timing indicated by the time information Etim for the early stop determination (predetermined timing). When the cumulative dose value is equal to or larger than the threshold value Eth for the early stop determination as a predetermined condition (YES in step S706), the processing proceeds to step S707. When the cumulative dose value is less than the threshold value Eth for the early stop determination (NO in step S706), the processing proceeds to step S713.

In step S713, the control unit 225 determines whether a lighting field detecting a cumulative dose value less than the early stop determination threshold value Eth is surrounded by lighting fields having a cumulative dose value of Eth or larger. When the lighting field detecting a cumulative dose value less than the early stop determination threshold value Eth is surrounded by lighting fields having a cumulative dose value of Eth or larger (YES in step S713), the processing returns to step S707. When the lighting field detecting a cumulative dose value less than the early stop determination threshold value Eth is not surrounded by lighting fields having a cumulative dose value of Eth or larger (NO in step S713), the processing proceeds to step S714.

In step S714, the control unit 225 compares the cumulative dose value estimated from the protocol information with the actual cumulative dose value to determine whether the matching is achieved. When the matching is achieved (YES in step S714), the processing returns to step S707. When the matching is not achieved (NO in step S714), the processing proceeds to step S711.

Subsequent control is similar to the control according to the first embodiment, and redundant descriptions thereof will be omitted.

As described above, the control unit 225 compares the cumulative dose information estimated from the protocol information with the actual cumulative dose information, and, if the matching is not achieved, performs the early stop processing. Therefore, the present embodiment enables suitably performing the early stop processing based on the protocol information.

Although the present embodiment uses the same Eth value in all lighting fields as illustrated in FIGS. 13B and 13C, the present disclosure is not limited thereto. For example, the lighting fields 1554 and 1555 overlapping with the mediastinal region have a tendency of output of a low cumulative dose relative to the regions of the lighting fields 1553 and 1556 overlapping with the lung field. Therefore, the Eth value in the lighting fields 1554 and 1555 may be set to a value lower than the Eth value in the lighting fields 1553 and 1556. The Eth value may be determined, for example, to be uniformly 10% of the cumulative dose in each lighting field estimated from the protocol information.

The present embodiment has been described above centering on an example where the imaging condition information includes the protocol information, and the output estimated based on the protocol information is compared with the actual output. However, if a protocol is estimated from the actual output even without the protocol information, the control unit 225 may compare the estimated protocol information with the output to determine whether to perform the early stop processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

The present disclosure is applicable to a system including a plurality of devices and to an apparatus including one device. For example, a part of a software module may be executed by an external server, and the function may be implemented by acquiring a result of processing by the external server.

The first and second embodiments have been described above centering on examples where the imaging pixels 101 for imaging and the detection pixels 121 for dose detection are formed on the same single substrate. However, the imaging pixels 101 for imaging and the detection pixels 121 for dose detection may be formed on different substrates and disposed in an overlapped way. This configuration enables disposing the imaging pixels 101 at positions of the detection pixels 121 according to the above-described embodiments, increasing the amount of information to be included in a radiation image.

The first and second embodiments have been described above centering on examples where the control unit 225 determines whether to perform the early stop processing, by using one determination criterion at the early stop determination timing. However, processing performed by using the radiation dose information obtained at the early stop determination timing is not limited to the transmission of an early stop notification. For example, the control unit 225 may perform the following plurality of pieces of processing based on the radiation dose information acquired at the early stop determination timing. (1) The control unit 225 transmits an early stop notification if the radiation dose outputs of the pixels for radiation detection do not satisfy the determination criterion based on the backup time and the target radiation dose. (2) Alternatively, the control unit 225 notifies the user of the insufficient irradiation if the determination criterion is not satisfied, and the radiation dose outputs of the pixels for radiation detection have an increase trend with an inclination equal to or larger than a threshold value. (3) Alternatively, the control unit 225 notifies the user of the failure to perform the radiation irradiation if the determination criterion is not satisfied, and the radiation dose outputs of the pixels for radiation detection do not have an increase trend. The contents of the notification to the radiation generation apparatus 300 are changed based on the dose information in this way. This enables the user to determine whether the radiation irradiation is insufficient or not performed at all and supplementarily identify what kind of defect causes insufficient radiation irradiation. These notifications may be displayed (notified) on the display unit 432 via the UI control unit 430, or notified to the user in an audible form in addition to the display form. The notifications (1) and (2) or the notifications (1) and (3) may be transmitted at the same time. Alternatively, only the notification (2) or (3) may be transmitted, and the radiation generation apparatus 300 may perform the determination for the early stop processing.

Figure 7:
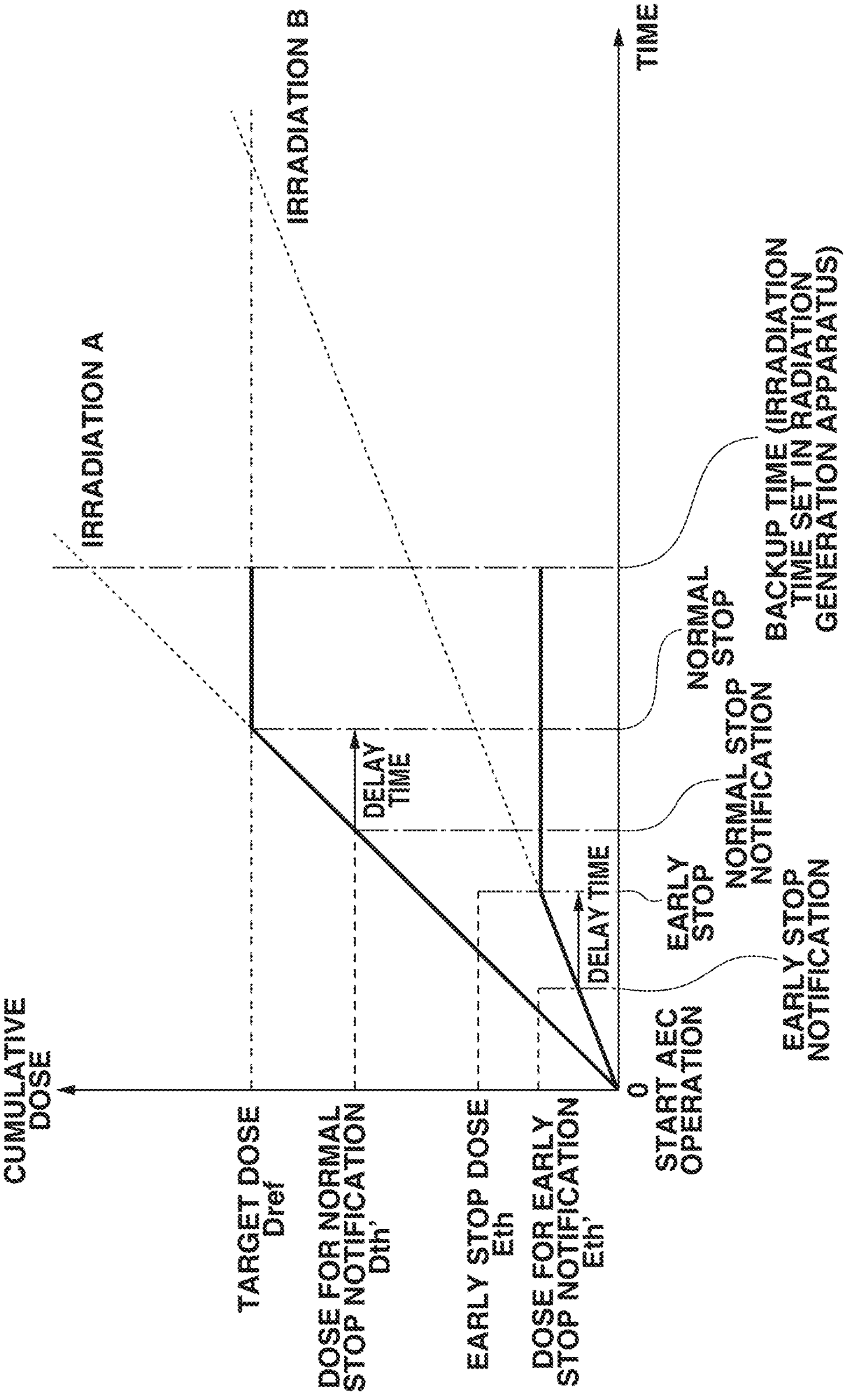
FIG. 7 illustrates an early stop in consideration of a delay time.

The first embodiment has been described above on the premise that the stop notification timing is the same as the radiation irradiation timing. However, depending on the operating environment of the radiation imaging system 1, a communication delay may arise between the radiation imaging apparatus 10 and the control apparatus 400 and between the control apparatus 400 and the radiation generation unit 300. Such a communication delay prolongs the time period till the radiation actually stops even with the accurate timing of the stop determination, possibly degrading the effect of restricting the exposure dose to the subject. In an environment involving such a communication delay, therefore, the control unit 225 needs to perform the stop determination earlier for this communication delay to stop the radiation irradiation at the originally desired timing. FIG. 7 illustrates the early stop processing in consideration of the delay time.

As illustrated in FIG. 7, in an environment where a delay time due to a communication delay arises, the control unit 225 needs to issue an early stop notification earlier than the desired early stop timing by the delay time. For example, if the desired early stop timing is X % (e.g., 30%) of the backup time Bt, the timing of issuing the early stop notification is set to X' % (e.g., 20%) of the backup time Bt. Likewise, if the desired radiation dose Eth subjected to the early stop processing is Y % (e.g., 30%) of the target radiation dose Dref, a radiation dose Eth' at the issuance of the early stop notification is set to Y' % (e.g., 20%) of the target radiation dose Dref. Since the duration of the communication delay depends on the environment, the control unit 225 needs to measure the communication status to obtain the duration immediately before performing the radiation imaging.

These parameters for stopping the radiation irradiation can be set to values specific to each system. Each of these parameters may be set to one value for each individual system. The control unit 225 may compare the irradiation conditions (kV, mA, ms, and focal point size) for the generation apparatus stored in a table with set irradiation conditions, and set suitable time information. The control unit 225 may capture the actual occurrence time in the past imaging under the same conditions, and set the occurrence time for the following imaging.

The disclosure of the present embodiment includes the following configurations and methods:

[Configuration 1]

A radiation imaging apparatus includes a radiation detector configured to be subjected to an incident radiation to obtain a radiation image, a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, after a start of the radiation imaging based on the imaging condition information, a notification for stopping the radiation irradiation by a radiation generation apparatus so that the radiation irradiation by the radiation generation apparatus stops before the incident radiation dose reaches the target radiation dose.

[Configuration 2]

In the radiation imaging apparatus according to configuration 1, the notification is issued in a case where, after the start of the radiation imaging based on the imaging condition information, radiation dose information acquired by a predetermined timing does not satisfy a predetermined condition, and the notification is not issued in a case where, after the start of the radiation imaging based on the imaging condition information, the radiation dose information acquired by the predetermined timing satisfies the predetermined condition.

[Configuration 3]

In the radiation imaging apparatus according to configuration 2, the predetermined timing is a timing starting from any one of a start of a radiation dose detection operation, an exposure permission, a start of an accumulation operation, and a start of radiation.

[Configuration 4]

In the radiation imaging apparatus according to configuration 2 or 3, the predetermined condition is a condition that the dose information acquired by the predetermined timing exceeds a predetermined threshold value.

[Configuration 5]

In the radiation imaging apparatus according to any one of configurations 2 to 4, the predetermined timing is a timing determined based on radiation irradiation time set in the radiation generation apparatus.

[Configuration 6]

In the radiation imaging apparatus according to any one of configurations 1 to 5, the apparatus includes a unit configured to issue a further notification for stopping the radiation irradiation by the radiation generation apparatus to complete the radiation imaging after subjecting the radiation detector to the incident radiation for up to the target radiation dose.

[Configuration 7]

In the radiation imaging apparatus according to any one of configurations 1 to 6, the notification is preferentially processed over other communications.

[Configuration 8]

In the radiation imaging apparatus according to any one of configurations 1 to 7, the notification is based on a communication delay between the radiation imaging apparatus and the radiation generation apparatus.

[Configuration 9]

In the radiation imaging apparatus according to any one of configurations 1 to 8, the imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information.

[Configuration 10]

In the radiation imaging apparatus according to any one of configurations 1 to 9, in the radiation detector, imaging pixels for acquiring the radiation image and detection pixels for acquiring the radiation dose information are disposed on a same single substrate.

[Configuration 11]

In the radiation imaging apparatus according to any one of configurations 1 to 9, the detection pixels for acquiring the radiation dose information are disposed on a substrate different from a substrate of the imaging pixels for acquiring the radiation image.

[Configuration 12]

There is provided a radiation imaging system including the radiation imaging apparatus according to any one of configurations 1 to 11, and the radiation generation apparatus.

[Configuration 13]

In a radiation imaging system including a radiation imaging apparatus having a radiation detector configured to be subjected to an incident radiation to obtain a radiation image, and a radiation generation apparatus configured to perform radiation irradiation, the radiation generation apparatus includes a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to stop, after a start of the radiation imaging based on the imaging condition information, radiation irradiation before the incident radiation dose reaches the target radiation dose.

[Configuration 14]

A radiation imaging system includes a radiation imaging apparatus having a radiation detector configured to be subjected to an incident radiation to obtain a radiation image, and a notification apparatus configured to notify a user of information. The radiation imaging apparatus includes a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, after a start of the radiation imaging based on the imaging condition information, a notification to the notification apparatus based on radiation dose information acquired by a predetermined timing before the target radiation dose is reached. The notification apparatus includes a unit configured to issue a notification to the user based on the notification.

[Configuration 15]

In the radiation imaging system according to configuration 14, the notification notifies the user of insufficient incident radiation.

[Configuration 16]

In the radiation imaging system according to configuration 14, the notification notifies the user of no incident radiation.

[Configuration 201]

A radiation imaging apparatus includes a radiation detector configured to be subjected to an incident radiation emitted by a radiation generation apparatus, to obtain a radiation image, a unit configured to permit the radiation irradiation performed by the radiation generation apparatus, a unit configured to acquire time information since the permission is issued till the radiation generation apparatus performs the radiation irradiation, a unit configured to acquire radiation dose information of the radiation incident on the radiation detector, a unit configured to acquire imaging condition information for radiation imaging for subjecting the radiation detector to the incident radiation for up to a target radiation dose to acquire a radiation image, and a unit configured to issue, in a case where, after a start of the radiation imaging based on the imaging condition information, radiation dose information acquired by a predetermined timing based on at least the time information satisfies a predetermined condition, a notification for stopping the radiation irradiation by the radiation generation apparatus so that the radiation irradiation by the radiation generation apparatus stops before the incident radiation dose reaches the target radiation dose.

[Configuration 202]

In the radiation imaging apparatus according to configuration 201, the notification is issued in a case where, after the start of the radiation imaging based on the imaging condition information, the radiation dose information acquired by the predetermined timing does not satisfy the predetermined condition. The notification is not issued in a case where, after the start of the radiation imaging based on the imaging condition information, the radiation dose information acquired by the predetermined timing satisfies the predetermined condition.

[Configuration 203]

In the radiation imaging apparatus according to configuration 202, the predetermined timing is a timing starting from any one of a start of a radiation dose detection operation, an exposure permission, a start of an accumulation operation, and a start of radiation.

[Configuration 204]

In the radiation imaging apparatus according to configuration 202 or 203, the predetermined condition is a condition that the radiation dose information acquired by the predetermined timing exceeds a predetermined threshold value.

[Configuration 205]

In the radiation imaging apparatus according to any one of configurations 202 to 204, the predetermined timing is a timing determined based on radiation irradiation time set in the radiation generation apparatus.

[Configuration 206]

In the radiation imaging apparatus according to any one of configurations 201 to 205, the apparatus includes a unit configured to issue a further notification for stopping the radiation irradiation by the radiation generation apparatus to complete the radiation imaging after subjecting the radiation detector to the incident radiation for up to the target radiation dose.

[Configuration 207]

In the radiation imaging apparatus according to any one of configurations 201 to 206, the notification is preferentially processed over other communications.

[Configuration 208]

in the radiation imaging apparatus according to any one of configurations 201 to 207, the notification is based on a communication delay between the radiation imaging apparatus and the radiation generation apparatus.

[Configuration 209]

In the radiation imaging apparatus according to any one of configurations 201 to 208, the imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information.

[Configuration 210]

In the radiation imaging apparatus according to any one of configurations 201 to 209, in the radiation detector, imaging pixels for acquiring the radiation image and detection pixels for acquiring the radiation dose information are disposed on a same single substrate.

[Configuration 211]

In the radiation imaging apparatus according to any one of configurations 201 to 209, the detection pixels for acquiring the radiation dose information are disposed on a substrate different from a substrate of the imaging pixels for acquiring the radiation image.

[Configuration 212]

There is provided a radiation imaging system including the radiation imaging apparatus according to any one of configurations 201 to 211, and the radiation generation apparatus.

[Configuration 301]

A radiation imaging apparatus includes a radiation detector configured to be subjected to an incident radiation having penetrated a subject to acquire a radiation image, the radiation detector having a plurality of lighting fields for acquiring radiation dose information of the incident radiation, a unit configured to acquire imaging condition information for radiation imaging for subjecting a predetermined lighting field group out of the plurality of lighting fields to the incident radiation for up to a target radiation dose to acquire a radiation image, and a unit configured to issue, in a case where, after a start of the radiation imaging based on the imaging condition information, radiation dose information of the predetermined lighting field group does not satisfy a predetermined condition, a notification for stopping radiation irradiation by a radiation generation apparatus so that the radiation irradiation by the radiation generation apparatus stops before a radiation dose incident on the predetermined lighting field reaches the target radiation dose.

[Configuration 302]

In the radiation imaging apparatus according to configuration 301, the notification is issued in a case where, after a start of the radiation imaging based on the imaging condition information, the radiation dose information acquired from the predetermined lighting field group by a predetermined timing does not satisfy the predetermined condition. The notification is not issued in a case where, after the start of the radiation imaging based on the imaging condition information, the radiation dose information acquired from the predetermined lighting field group by the predetermined timing satisfies the predetermined condition.

[Configuration 303]

In the radiation imaging apparatus according to configuration 302, the predetermined timing is a timing starting from any one of a start of a radiation dose detection operation, an exposure permission, a start of an accumulation operation, and a start of radiation.

[Configuration 304]

In the radiation imaging apparatus according to configuration 302 or 303, the predetermined condition is a condition that the radiation dose information acquired from the predetermined light field group by the predetermined timing exceeds a predetermined threshold value.

[Configuration 305]

In the radiation imaging apparatus according to any one of configurations 302 to 304, the predetermined timing is a timing determined based on radiation irradiation time set in the radiation generation apparatus.

[Configuration 306]

In the radiation imaging apparatus according to configuration 301, the notification is issued in a case where, after the start of the radiation imaging based on the imaging condition information, the radiation dose information acquired from the predetermined lighting field group by a predetermined timing does not satisfy the predetermined condition, and the radiation dose information acquired from another lighting field group related to the predetermined light field group does not satisfy the predetermined condition.

[Configuration 307]

In the radiation imaging apparatus according to configuration 306, the notification is not issued in a case where, after the start of the radiation imaging based on the imaging condition information, the radiation dose information acquired from the predetermined lighting field group by the predetermined timing does not satisfy the predetermined condition, and the radiation dose information acquired from the another lighting field group satisfies the predetermined condition.

[Configuration 308]

In the radiation imaging apparatus according to any one of configurations 301 to 307, the predetermined condition is a threshold value condition determined based on the target radiation dose.

[Configuration 309]

In the radiation imaging apparatus according to any one of configurations 301 to 307, the predetermined condition is a comparison condition determined based on the imaging condition information.

[Configuration 310]

In the radiation imaging apparatus according to configuration 309, the imaging condition information includes information for identifying an imaging portion, and the radiation dose information of the predetermined lighting field group is radiation dose distribution information. The radiation imaging apparatus includes a unit configured to determine whether to issue the notification based on a difference between the information about the imaging portion and the radiation dose distribution information as the comparison condition.

[Configuration 311]

In the radiation imaging apparatus according to any one of configurations 301 to 310, the predetermined lighting field group is a part of the plurality of lighting fields.

[Configuration 312]

In the radiation imaging apparatus according to any one of configurations 301 to 311, the apparatus includes a unit configured to issue a further notification for stopping the radiation irradiation by the radiation generation apparatus to complete the radiation imaging after subjecting the predetermined lighting field to the incident radiation for up to the target radiation dose.

[Configuration 313]

In the radiation imaging apparatus according to any one of configurations 301 to 312, the notification is preferentially processed over other communications.

[Configuration 314]

In the radiation imaging apparatus according to any one of configurations 301 to 313, the notification is based on a communication delay between the radiation imaging apparatus and the radiation generation apparatus.

[Configuration 315]

In the radiation imaging apparatus according to any one of configurations 301 to 314, the imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information.

[Configuration 316]

In the radiation imaging apparatus according to any one of configurations 301 to 315, in the radiation detector, imaging pixels for acquiring the radiation image and detection pixels for acquiring the radiation dose information are disposed on a same single substrate.

[Configuration 317]

In the radiation imaging apparatus according to any one of configurations 301 to 316, detection pixels for acquiring the radiation dose information are disposed on a substrate different from a substrate of imaging pixels for acquiring the radiation image.

[Configuration 318]

There is provided a radiation imaging system including the radiation imaging apparatus according to any one of configurations 301 to 317, and the radiation generation apparatus.

While the present disclosure has been described with reference to embodiments, it is to be understood that the disclosure is not limited to the disclosed embodiments. The scope of the following claims encompass all such modifications and equivalent structures and functions.

This application claims the benefit of Japanese Patent Applications No. 2023-074208, filed Apr. 28, 2023. No. 2023-074209, filed Apr. 28, 2023, No. 2023-100299, filed Jun. 19, 2023, and No. 2024-009255, filed Jan. 25, 2024, which are hereby incorporated by reference herein in their entirety.

What is claimed is:

1. A radiation imaging apparatus comprising:

a radiation detector configured to be subjected to an incident radiation to obtain a radiation image; and one or more controllers configured to:

acquire radiation dose information of the radiation incident on the radiation detector;

acquire imaging condition information for radiation imaging for subjecting the radiation detector to the incident radiation for up to a target radiation dose to acquire the radiation image; and issue, in a case where, after a start of the radiation imaging based on the imaging condition information, radiation dose information acquired by a predetermined timing does not satisfy a predetermined condition, a notification for stopping the radiation irradiation by a radiation generation apparatus so that the radiation irradiation by the radiation generation apparatus stops before the incident radiation dose reaches the target radiation dose, wherein radiation irradiation time set in the radiation generation apparatus includes a backup time, and wherein the predetermined timing is a timing corresponding to a predetermined proportion of the backup time.

2. The radiation imaging apparatus according to claim 1, wherein the notification is issued in a case where, after the start of the radiation imaging based on the imaging condition information, the radiation dose information acquired by the predetermined timing does not satisfy the predetermined condition, and wherein the notification is not issued in a case where, after the start of the radiation imaging based on the imaging condition information, the radiation dose information acquired by the predetermined timing satisfies the predetermined condition.

3. The radiation imaging apparatus according to claim 1, wherein the one or more controllers are further configured to issue a further notification for stopping the radiation irradiation by the radiation generation apparatus to complete the radiation imaging after subjecting the radiation detector to the incident radiation for up to the target radiation dose.

4. The radiation imaging apparatus according to claim 1, wherein the notification is preferentially processed over other communications.

5. The radiation imaging apparatus according to claim 1, wherein the notification is based on a communication delay between the radiation imaging apparatus and the radiation generation apparatus.

6. The radiation imaging apparatus according to claim 1, wherein the imaging condition information includes any one of an X-ray tube voltage and an X-ray tube current in a radiation tube, the target radiation dose, a threshold value for normal stop determination, set irradiation time, timing information for early stop determination, threshold value information for early stop determination, and lighting field information.

7. The radiation imaging apparatus according to claim 1, wherein, in the radiation detector, imaging pixels for acquiring the radiation image and detection pixels for acquiring the radiation dose information are disposed on a same single substrate.

8. The radiation imaging apparatus according to claim 1, wherein detection pixels for acquiring the radiation dose information are disposed on a substrate different from a substrate of imaging pixels for acquiring the radiation image.

9. The radiation imaging apparatus according to claim 2, wherein the predetermined timing is a timing starting from any one of a start of a radiation dose detection operation, an exposure permission, a start of an accumulation operation, and a start of radiation.

10. The radiation imaging apparatus according to claim 2, wherein the predetermined condition is a condition that the radiation dose information acquired by the predetermined timing exceeds a predetermined threshold value, and wherein the predetermined threshold value corresponds to a predetermined proportion of the target radiation dose.

11. A radiation imaging system comprising a radiation imaging apparatus having a radiation detector configured to be subjected to an incident radiation to obtain a radiation image, and a radiation generation apparatus configured to perform radiation irradiation, the radiation imaging system comprising one or more controllers configured to:

acquire radiation dose information of the radiation incident on the radiation detector;

acquire imaging condition information for radiation imaging for subjecting the radiation detector to the incident radiation for up to a target radiation dose to acquire the radiation image; and stop, in a case where, after a start of the radiation imaging based on the imaging condition information, radiation dose information acquired by a predetermined timing does not satisfy a predetermined condition, the radiation irradiation by the radiation generation apparatus before the incident radiation dose reaches the target radiation dose, wherein radiation irradiation time set in the radiation generation apparatus includes a backup time, and wherein the predetermined timing is a timing corresponding to a predetermined proportion of the backup time.

12. A radiation imaging system comprising:

a radiation imaging apparatus comprising one or more controllers configured to:

acquire radiation dose information of radiation incident on a radiation detector;

acquire imaging condition information for radiation imaging for subjecting the radiation detector to the incident radiation for up to a target radiation dose to acquire the radiation image; and issue a notification to a notification apparatus in a case where, after a start of the radiation imaging based on the imaging condition information, radiation dose information acquired by a predetermined timing does not satisfy a predetermined condition, based on radiation dose information acquired by the predetermined timing before the target radiation dose is reached, a radiation generation apparatus configured to perform radiation irradiation; and the notification apparatus configured to notify a user of information based on the notification, wherein a radiation irradiation time set in the radiation generation apparatus includes a backup time, and wherein the predetermined timing is a timing corresponding to a predetermined proportion of the backup time.

13. The radiation imaging system according to claim 12, wherein the notification notifies the user of insufficient incident radiation.

14. The radiation imaging system according to claim 12, wherein the notification notifies the user of no incident radiation.

15. A radiation imaging system comprising a radiation imaging apparatus having a radiation detector configured to be subjected to an incident radiation to obtain a radiation image, and a radiation generation apparatus configured to perform radiation irradiation, the radiation imaging system comprising one or more controllers configured to:

permit the radiation irradiation by the radiation generation apparatus;

acquire time information from issuance of the permission until the radiation generation apparatus performs the radiation irradiation, the time information corresponding to a radiation condition;

acquire radiation dose information of the radiation incident on the radiation detector;

acquire imaging condition information for radiation imaging for subjecting the radiation detector to the incident radiation for up to a target radiation dose to acquire the radiation image; and issue, in a case where, after a start of the radiation imaging based on the imaging condition information, the radiation dose information acquired at a predetermined timing determined based on at least the time information does not satisfy a predetermined condition, a notification for stopping the radiation irradiation by the radiation generation apparatus so that the radiation irradiation by the radiation generation apparatus stops before the incident radiation dose reaches the target radiation dose, wherein a radiation irradiation time set in the radiation generation apparatus includes a backup time, and wherein the predetermined timing corresponds to a predetermined proportion of the backup time.

16. A radiation imaging system comprising a radiation imaging apparatus having a radiation detector configured to be subjected to an incident radiation to obtain a radiation image, and a radiation generation apparatus configured to perform radiation irradiation, the radiation imaging system comprising one or more controllers configured to:

acquire imaging condition information for radiation imaging for subjecting a predetermined lighting field group out of a plurality of lighting fields of the radiation imaging apparatus to the incident radiation for up to a target radiation dose to acquire the radiation image; and issue, in a case where, after a start of the radiation imaging based on the imaging condition information, radiation dose information of the predetermined lighting field group acquired by a predetermined timing does not satisfy a predetermined condition, a notification for stopping the radiation irradiation by the radiation generation apparatus so that the radiation irradiation by the radiation generation apparatus stops before a radiation dose incident on the predetermined lighting field reaches the target radiation dose, wherein a radiation irradiation time set in the radiation generation apparatus includes a backup time, and wherein the predetermined timing is a timing corresponding to a predetermined proportion of the backup time.

* * * * *